(12) United States Patent
Tokuda et al.

(10) Patent No.: US 7,698,320 B2
(45) Date of Patent: Apr. 13, 2010

(54) DATABASE MANAGEMENT SYSTEM TO REDUCE CAPACITY OF STORAGE VOLUME

(75) Inventors: Seisuke Tokuda, Kokubunji (JP); Shinji Fujiwara, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 566 days.

(21) Appl. No.: 11/708,012

(22) Filed: Feb. 20, 2007

(65) Prior Publication Data

US 2008/0071842 A1    Mar. 20, 2008

(30) Foreign Application Priority Data

Sep. 20, 2006   (JP)   ............................. 2006-254067

(51) Int. Cl.
*G06F 7/00*   (2006.01)
*G06F 17/00*  (2006.01)

(52) U.S. Cl. .................. 707/674; 707/679; 711/100; 711/112; 714/13

(58) Field of Classification Search ................. 707/674, 707/679; 711/100, 112; 714/13
See application file for complete search history.

(56) References Cited

U.S. PATENT DOCUMENTS

| | | | |
|---|---|---|---|
| 6,839,819 B2 * | 1/2005 | Martin | 711/162 |
| 7,028,216 B2 * | 4/2006 | Aizawa et al. | 714/7 |
| 7,529,966 B2 * | 5/2009 | Cochran et al. | 714/6 |
| 2003/0135783 A1 * | 7/2003 | Martin et al. | 714/13 |
| 2004/0139128 A1 * | 7/2004 | Becker et al. | 707/204 |
| 2004/0193945 A1 | 9/2004 | Eguchi et al. | |
| 2005/0108302 A1 * | 5/2005 | Rand et al. | 707/204 |
| 2006/0150001 A1 | 7/2006 | Eguchi et al. | |
| 2007/0245105 A1 * | 10/2007 | Suzuki et al. | 711/162 |

FOREIGN PATENT DOCUMENTS

JP    2004-252686    2/2003

* cited by examiner

*Primary Examiner*—Etienne P LeRoux
*Assistant Examiner*—Chelcie Daye
(74) *Attorney, Agent, or Firm*—Stites & Harbison PLLC; Juan Carlos A. Marquez, Esq.

(57) ABSTRACT

Provided is a database management system coupled to a storage system comprising a first storage device for storing a database file and a control file, a second storage device for storing a journal corresponding to an update history of the data stored in the first storage device, and a third storage device for storing a log file; generating the journal upon receiving an update instruction; and recording the generated journal to the second storage device in correspondence with a check point. The database management system records the log to the third storage device in correspondence with identification information of the generated check point, restores data stored in the storage system by employing a journal stored in the second storage device before check point, and applies the log stored in the third storage device after the check point to restore a database file.

11 Claims, 14 Drawing Sheets

| CHECK POINT IDENTIFICATION INFORMATION 340 | JOURNAL STORAGE ADDRESS (LOGICAL STORAGE DEVICE NUMBER, ADDRESS WITHIN LOGICAL STORAGE DEVICE) 341 | TIME 342 | JOURNAL LASTING 343 |
|---|---|---|---|
| ABCDEF12 | 02, 3FEDCBA0 | 2006.07.01 15:00:00 | VALID |
| ABCDEF13 | 02, 50123456 | 2006.07.01 15:05:00 | INVALID |
| ... | ... | ... | ... |

FIG. 13

| LIST OF CHECK POINT INFORMATION | | | | |
|---|---|---|---|---|
| CHECK POINT IDENTIFICATION INFORMATION 350 | CHECK POINT EXECUTION LOGICAL STORAGE DEVICE NUMBER 351 | CHECK POINT IDENTIFICATION INFORMATION STORING LOGICAL STORAGE DEVICE NUMBER 352 | TIME 353 | CHECK POINT STATUS 354 |
| ABCDEF12 | 01 | 02 | 2006.07.01 15:00:00 | VALID |
| ABCDEF13 | 01 | 02 | 2006.07.01 15:05:00 | INVALID |
| ... | ... | ... | ... | ... |

FIG. 14

SETTING OF JOURNAL OVERWRITING OPTION

○ DO NOT OVERWRITE JOURNAL.  *360*

○ OVERWRITE JOURNAL FOR DATA UPDATING AT THE SAME ADDRESS. INHIBIT OVERWRITING OF JOURNAL AT TIME INSTANT WHEN CHECK POINT OF DBMS IS EXECUTED.  *361*

⦿ OVERWRITE JOURNAL FOR DATA UPDATING AT THE SAME ADDRESS. WHEN CHECK POINT OF DBMS IS EXECUTED, JUDGEMENT IS MADE AS TO WHETHER FURTHER OVERWRITING OF JOURNAL IS PERMITTED OR INHIBITED DEPENDING ON STATUS OF STORAGE SYSTEM.  *362*

*363*
> THIS SETTING OPERATION ALLOWS REDUCTION IN STORAGE CAPACITY OF JOURNAL STORAGE DEVICE WHILE DB CAN BE RECOVERED WITH TRANSACTION CONSISTENCY. IT SHOULD BE NOTED THAT THERE ARE SOME POSSIBILITIES THAT RECOVERY PROCESS PERFORMANCE OF DB IS SLIGHTLY INFLUENCED.

<u>SUBJECT AREA</u>

LOGICAL STORAGE DEVICE NUMBER  [ 01 ]  *364*

<u>STORAGE SYSTEM PARAMETERS DURING EXECUTION OF CHECK POINT</u>

WHEN NEXT PARAMETER VALUES ARE EXCEEDED DURING EXECUTION OF CHECK POINT, INHIBIT OVERWRITING OF JOURNAL.

◇ OVERWRITABLE JOURNAL AMOUNT  [ 4 ] MB  *365*

◇ EMPTY AREA RATIO OF JOURNAL STORAGE DEVICE  [ 20 ] %  *366*

*367* [ OK ]   [ CANCEL ]

FIG. 15

DATABASE MANAGEMENT SYSTEM TO REDUCE CAPACITY OF STORAGE VOLUME

CLAIM OF PRIORITY

The present application claims priority from Japanese patent application 2006-254067 filed on Sep. 20, 2006, the content of which is hereby incorporated by reference into this application.

BACKGROUND OF THE INVENTION

This invention relates to a database management system and a storage system. More specifically, this invention relates to a technique of reconstructing data by employing a journaling technique of a storage system.

In connection with popularization of utilization of databases in corporate activities, data reconstructing techniques constructed of back-up techniques and recovery techniques have been widely utilized in order to avoid data stored in the databases from being lost. A back-up operation of a database implies such a technical idea that data stored in the database are duplicated in a storage device such as a storage tape device in a periodic manner. A recovery operation of a database implies such a technical idea that back-up data recorded on a storage tape, or the like are first restored in the database. Thereafter, a record (will be referred to as "log" hereinafter) of changed data of from a time instant when the data were backed up in the restored database up to now, or until a certain past time instant is applied so as to reconstruct the database under such a status that consistency of a transaction is secured. A log is generated by a database management system, and indicates a history of changing operations with respect to the database.

In recent years, in order to shorten time required for restoring databases, a specific attention has been paid to database reconstructing methods using journaling techniques. This journaling technique is also called as a continuous data protection (CDP) technique, and is disclosed in, for example, JP 2004-252686 A. In the technical idea disclosed in JP 2004-252686 A, in the storage system, while both the database and the log are stored in the same storage device, every time the update instruction for the data is received, the update history (will be referred to as "journal" hereinafter) is recorded in another storage device (will be referred to as "journal storage device" hereinafter).

Also, the database management system executes a check point process operation in order that data stored in a buffer of the database management system is made coincident with data stored in a storage system. When the database management system finishes the check point process operation, the storage system receives a check point command from the database management system, and generates a journal in correspondence with identification information of the check point, and then records the generated journal in the journal storage device.

When the storage system receives a restore instruction containing the identification information of the check point from the database management system, the storage system restores the database and the log at high speed by employing a journal recorded in the journal storage device before the journal corresponding to the identification information of the check point contained in the restore instruction. Then, when the restoring operations of both the database and the log are finished, the database management system applies the log to the database to secure the transaction consistency, and then finishes the recovery operation of the database.

SUMMARY OF THE INVENTION

In the conventional database back-up and recovery methods, when the database is restored, data portions (data portion where back-up data is coincident with original data for backup) which are not yet updated from the time instant when the back-up data was acquired are also read out. As a result, time required for the restore operation is increased in proportion to the scale of the database. Also, in the conventional back-up and recovery methods, management cost is increased since the databases must be backed up in a periodic manner by administrators.

On the other hand, in the technical idea disclosed in JP 2004-252686 A, only updated data is restored without interposing the host computer by utilizing the journal generated within the storage system, so the data can be restored at high speed. Also, since updating operations with respect to the database are continuously recorded as journals, the database need not be backed up in a periodic manner.

However, in this technical idea of JP 2004-252686 A, a journal must be recorded every time the database or the log is updated. As a result, a large storage capacity is necessary. For instance, in such a database management system for providing an OLTP application with respect to a large number of users, an update amount of data is increased. In connection with the increasing update amount, a large amount of logs are outputted. As a result, a storage capacity required for recording a journal becomes huge.

An object of this invention is to provide a database management system and a storage system capable of reducing a storage capacity used for recording journals, while utilizing a journaling technique of a storage system which has a high-speed restoring operation and does not require a periodic back-up operation.

A representative aspect of this invention is as follows. That is, there is provided a database management system, which is executed by a computer coupled to a storage system, in which: the storage system comprises a control unit for processing an access request transmitted from the computer, a first storage device, a second storage device, and a third storage device; the first storage device stores thereinto a database file which stores thereinto data accessed by the database management system, and a control file which includes control information of the database management system; the second storage device stores thereinto a journal corresponding to an update history of the data stored in the first storage device; the third storage device stores thereinto a log file which is generated by the database management system and records a log corresponding to the update history of the database file; in case of which the control unit receives an update instruction for the data stored in the first storage device, the control unit generates the journal and records the generated journal in the second storage device; in case of which the control unit receives from the computer a notification that a check point which constitutes a base point of a reconstruction of the database file has been generated, the control unit generates a journal in correspondence with identification information of the generated check point and records the generated journal in the second storage device; in case of which the control unit receives a restore instruction including the identification information of the check point from the computer, the control unit restores data which includes the database file and the control file and has been stored in the first storage device by employing a journal which has been recorded in the second storage device before the journal corresponding to the identification information of the check point included in the received restore instruction; the database management system comprising: a managing unit for recording a log in the log file in correspondence with the identification information of the generated check point in case of which the check point is generated, for recording the identification information of the generated check point in the control file, and for notifying a fact that the check point has been generated to the storage system in combination with the identification information of the generated check point; a log analyzing unit for, in case of which the log analyzing unit receives a recovery instruction including a reconstruction time instant, retrieving a log corresponding to the reconstruction time instant included in the recovery instruction from the log file to acquire a log which has been recorded before a time instant when the retrieved log corresponding to the reconstruction time instant was recorded and includes identification information of the latest check point, and transmitting the identification information of the check point included in the acquired log to the storage system in combination with the restore instruction; and a log applying unit for applying the log corresponding to the identification information of the check point recorded in the control file restored by the storage system up to the log corresponding to the reconstruction time instant with respect to the database file restored by the storage system.

In accordance with one embodiment of this invention, since log files are not handled as journaling subjects, for example, in the case where large amounts of logs are outputted in a certain work such as an OLTP application, storage capacities required for recording journals can be largely reduced.

BRIEF DESCRIPTION OF THE DRAWINGS

The present invention can be appreciated by the description which follows in conjunction with the following figures, wherein:

FIG. 13 is a diagram of a check point management information of the third embodiment of this invention;

FIG. 14 is a diagram of a check point management information display screen of the third embodiment of this invention; and FIG. 15 is a diagram of a function setting screen of the third embodiment of this invention.

DETAILED DESCRIPTION OF THE PREFERRED EMBODIMENTS

Referring now to the accompanying drawings, various embodiments of this invention will be described. It should be noted that the below-mentioned descriptions do not restrict this invention.

First Embodiment

Figure 1:
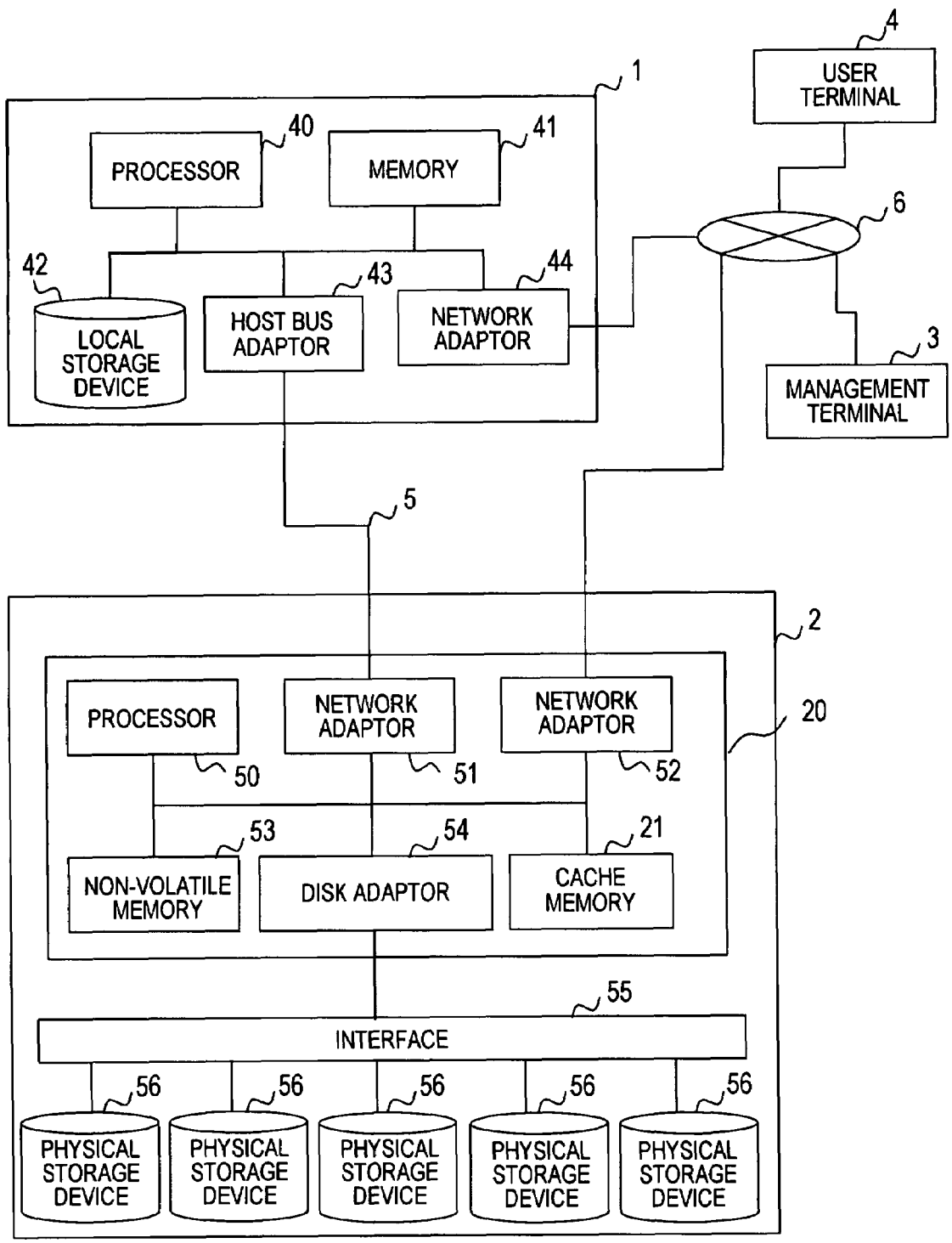
FIG. 1 is a hardware block diagram of a computer system according to a first embodiment of this invention.

FIG. 1 is a diagram for representing a hardware structure of a computer system in which a database management system (DBMS) 10 according to a first embodiment of this invention is operated. The computer system of FIG. 1 includes a host 1, a storage system 2, a management terminal 3, a user terminal 4, a network 5, and another network 6.

The host 1 is a computer such as a personal computer, a workstation, and a mainframe. In the host 1, an operating system (will be referred to as "OS" hereinafter) selected according to the sort of computer, and the DBMS 10 for providing an application to the user terminal 4 are operated. The host 1 includes a processor 40, a memory 41, a local storage device 42, a host bus adaptor 43, and a network adaptor 44.

The processor 40 executes a predetermined program. The memory 41 temporarily stores thereinto the OS and the DBMS 10 executed by the processor 40, and data used by the DBMS 10. The local storage device 42 stores thereinto the OS, the DBMS 10, and data used by the DBMS 10. The host bus adaptor 43 connects the network 5 to the host 1. The network adaptor 44 connects the network 6 to the host 1.

The storage system 2 corresponds to a system having a storage device such as a disk drive, or a plurality of storage devices such as disk arrays. Also, the storage system 2 stores thereinto data and programs which are used by the host 1. The storage system 2 receives an I/O process request sent from the host 1, executes a process operation in correspondence with the received I/O process request, and transmits a processed result to the host 1.

The storage system 2 includes a physical storage device 56, a control unit 20, and a interface 55. The interface 55 connects the physical storage device 56 to the control unit 20 with each other.

The control unit 20 executes a process operation of an I/O request issued from the host 1, and a control operation of the physical storage device 56. The control unit 20 includes a disk adaptor 54, a processor 50, a non-volatile memory 53, a cache memory 21, a network adaptor 51, and another network adaptor 52.

The processor 50 executes a predetermined program. The non-volatile memory 53 stores thereinto a program executed by the processor 50, information which is required to execute the program, and set information, structural information, and the like relating to the storage system 2. The cache memory 21 temporarily stores thereinto data inputted from the host 1, or data transferred from the storage system 2 to the host 1.

The disk adaptor 54 is connected via the interface 55 to the physical storage device 56. The network adaptor 51 connects the storage system 2 to the network 5. The network adaptor 52 connects the storage system 2 to the network 6.

The physical storage device 56 stores thereinto data which is used by the host 1. The physical storage device 56 is a non-volatile storage medium, and corresponds to, for instance, a hard disk constructed of magnetic disks, and the like.

The storage system 2 is arranged by a RAID (redundant array of Independent disks) structure having redundancy with a plurality of physical storage devices 56. The storage system 2 divides a storage area arranged by the plurality of physical storage devices 56 into logical storage areas, and provides these logical storage areas as a logical storage device to the host 1.

The management terminal 3 is used in order to perform maintenance/management operations of the storage system 2, and also to manage the DBMS 10 operated in the host 1. In the case where an administrator of the computer system performs maintenance/management operation of the storage system 2 and manages the DBMS 10, the administrator inputs setting contents to the management terminal 3. The management terminal 3 transmits the contents inputted by the administrator to both the storage system 2 and the DBMS 10 of the host 1 via the network 6.

The user terminal 4 requests a transaction process operation corresponding to an application with respect to the DBMS 10 of the host 1.

The network 5 connects the host 1 to the storage system 2 in order that a process request of I/O, and the like are transferred from the host 1 to the storage system 2. An optical fiber, a copper wire, and the like are employed for the network 5. Also, in the network 5, a communication protocol such as Fiber Channel, small computer system interface (SCSI), and transmission control protocol/internet protocol (TCP/IP) is used.

The network 6 connects the host 1, the storage system 2, the management terminal 3, and the user terminal 4 to each other. The network 6 communicates management information such as maintenance, configuration, and performance regarding the storage system 2 among the storage system 2, the management terminal 3, and the host 1. Also, the network 6 is used so as to transfer an I/O process request and the like between the user terminal 4 and the host 1. Both a cable and a communication protocol, which are employed in the network 6, may be the same as those of the network 5, or may be alternatively different from those.

Figure 2:
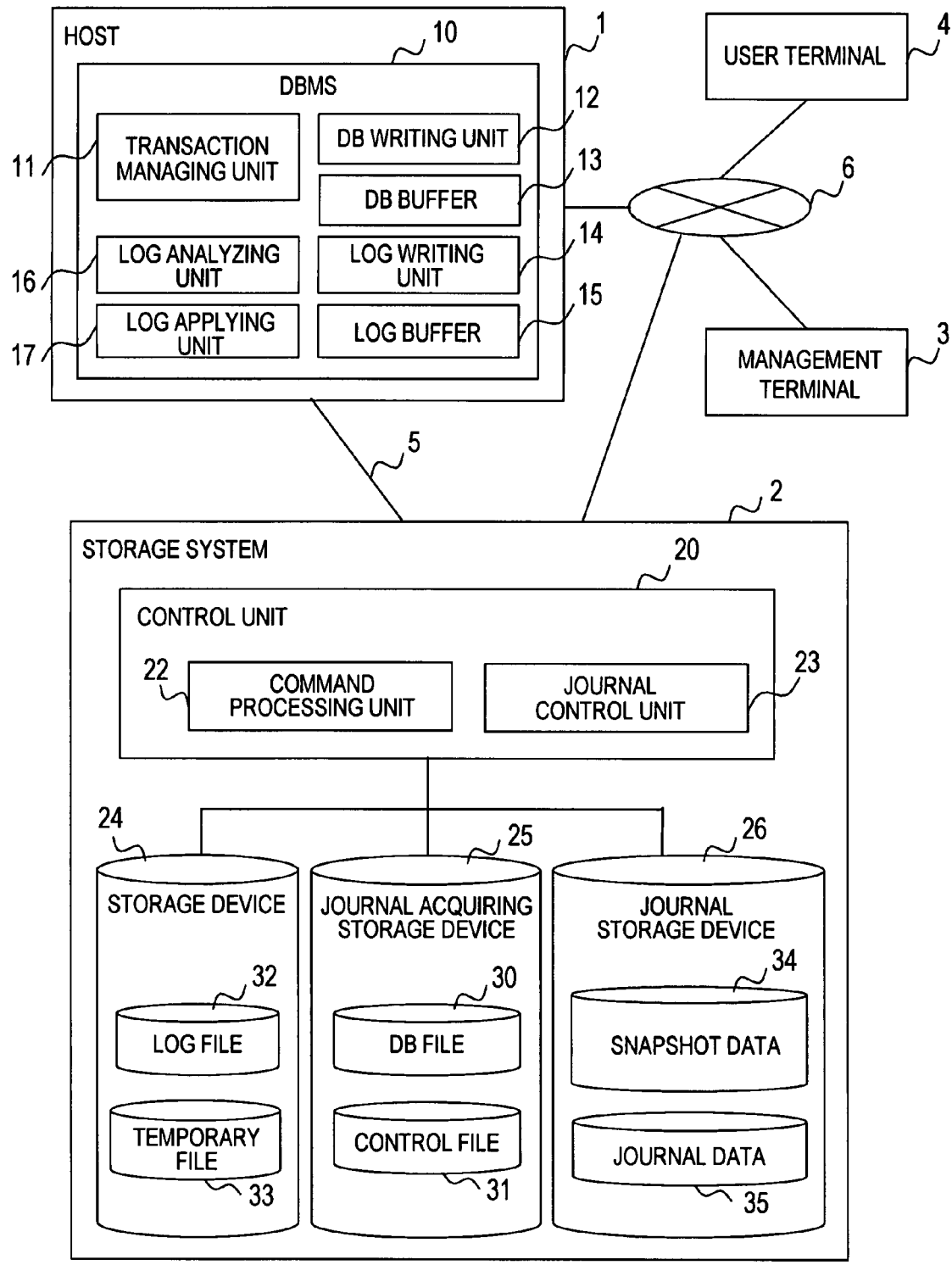
FIG. 2 is a software configuration diagram of a computer system according to the first embodiment of this invention.

FIG. 2 shows a software configuration diagram of the computer system according to the first embodiment.

The host 1 contains the DBMS 10. The DBMS 10 executes a transaction process operation in correspondence with an application, which is requested via the user terminal 4. Also, the DBMS 10 accesses a database (will be referred to as "DB" hereinafter) stored in the storage system 2 via the OS. The DBMS 10 is stored in either the local storage device 42 or the memory 41, and is executed by the processor 40.

The DBMS 10 manages a DB file 30, a control file 31, a log file 32, a temporary file 33, and the like. The DB file 30, the control file 31, the log file 32, and the temporary file 33 are stored in the storage system 2.

The DB file 30 stores thereinto tables and indexes, which correspond to data of the DB. The control file 31 corresponds to a file which records therein a present status of the DB, and contains information required for recovering the DB. The log file 32 stores thereinto a log corresponding to an update history of the DB file 30. The temporary file 33 is temporarily used in a case where data is sorted, and the like.

The DBMS 10 contains a transaction managing unit 11, a DB buffer 13, a log buffer 15, a DB writing unit 12, and a log writing unit 14.

The transaction managing unit 11 accesses the DB file 30 of the storage system 2 corresponding to a transaction process operation requested from the user terminal 4.

The DB buffer 13 corresponds to an area which is exclusively designed for the DBMS 10 and is secured on the memory 41 of the host 1, while the DB buffer 13 temporarily holds data of the DB file 30 of the storage system 2. The log buffer 15 corresponds to such an area which is similarly secured on the memory 41, while the log buffer 15 temporarily holds a generated log.

The DB writing unit 12 writes changed data held in the DB buffer 13 into the DB file 30 of the storage system 2. The log writing unit 14 writes a log held in the log buffer 15 into the log file 32 of the storage system 2.

Further, the DBMS 10 contains a log analyzing unit 16 and a log applying unit 17. When the log analyzing unit 16 receives a recovery instruction of the DB, which contains a reconstruction time instant, the log analyzing unit 16 analyzes the log file 32 so as to acquire a restore time instant immediately before the reconstruction time instant which is instructed to the storage system 2. The log applying unit 17 applies a log recorded in the log file 32 to the DB file 30 restored by the storage system 2.

The storage system 2 contains a storage device 24, a journal acquiring storage device 25, a journal storage device 26, and a control unit 20. The storage device 24, the journal acquiring storage device 25, and the journal storage device 26 correspond to a logical storage device arranged by the physical storage device 56.

The journal acquiring storage device 25 stores thereinto the DB file 30 and the control file 31. When data stored in the journal acquiring storage device 25 is updated, a journal corresponding to an update history is recorded in the journal storage device 26.

The storage device 24 stores thereinto the log file 32 and the temporary file 33. Since the journal of the stored data is not acquired, the storage device 24 may alternatively set mirroring in order to avoid a loss of data. In this mirroring, data stored in the storage device 24 is duplicated in another storage device in real time. Further, the log file 32 and the temporary file 33 may be alternatively stored in a logical storage device different from the above-mentioned logical storage device.

The journal storage device 26 stores thereinto journal data 35 and snapshot data 34. The journal data 35 stores an update history of data stored in the journal acquiring storage device 25. The snapshot data 34 corresponds to a duplication of data stored in the journal acquiring storage device 25 at a certain time instant. It should be noted that the snapshot data 34 may not be stored in the journal storage device 26, but may be alternatively stored in another stored device.

As previously described, since the files to be managed by the DBMS 10 are arranged, only the journals of the DB file 30 and the control file 31 are acquired, but the journals of the log file 32 and the temporary file 33 are not acquired, so a storage capacity required for the journal storage device 26 can be reduced.

Also, the above-mentioned data managed by the DBMS 10 may be stored via the file system of the OS in the storage system 2, or may be alternatively stored without via the file system into the storage system 2 by employing a raw device of the OS.

In the control unit 20, programs which constitute a command processing unit 22 and a journal control unit 23 are provided in the non-volatile memory 53.

When the control unit 20 receives an I/O process request issued from the host 1 via the network adaptor 51, the control unit 20 executes the program for constituting the command processing unit 22.

When the received I/O process request corresponds to a data writing request, the control unit 20 writes write-purpose data (will be referred to as "write data" hereinafter) transferred from the host 1 into either the cache memory 21 or the physical storage device 56. Also, the control unit 20 writes the write data stored in the cache memory 21 into the physical storage unit 56.

When the received I/O process request corresponds to a data reading request, the control unit 20 reads out data corresponding to the reading request (will be referred to as "read data" hereinafter) from either the cache memory 21 or the physical storage device 56 to transfer the data to the host 1. Also, the control unit 20 stores the read data in the cache memory 21.

It should be noted that when the control unit 20 executes an I/O processing operation, the control unit 20 specifies an address of the logical storage device in which the data designated by the I/O process request has been stored, and a corresponding address of the physical storage device 56, and then, accesses the specific physical storage device 56.

When the control unit 20 generates or updates a journal, the control unit 20 executes the journal control unit 23. The journal control unit 23 is arranged by a program for executing a process operation. Also, the journal control unit 23 is executed when the control unit 20 receives a check point command transmitted from the host 1, restores data by employing the generated journal, and sets a logical storage device which is a journal acquisition subject.

When the control unit 20 receives a journal acquisition starting instruction from the host 1, the control unit 20 sets a logical storage device (namely, journal acquiring storage device 25) which is a journal acquisition subject in response to the journal acquisition starting instruction. Subsequently, the control unit 20 sets a logical storage device journal storage device 26) into which the snapshot data 34 and the journal data 35 are stored. Then, the control unit 20 stores the snapshot data 34 of the journal acquiring storage device 25 into the journal storage device 26.

When the control unit 20 receives a write process request with respect to the journal acquiring storage device 25 from the host 1, the control unit 20 first stores the write data into the cache memory 21. Then, the control unit 20 generates a journal corresponding to the update history of the write data, and stores the generated journal into a predetermined journal-purpose area which is secured in the cache memory 21.

A journal is arranged by write data, an address which indicates a storage position of the write data in the journal acquiring storage device 25, and the like. A journal stored in the cache memory 21 is recorded in the journal storage device 26 in asynchronism with the storage of this journal into the cache memory 21. It should also be noted that the control unit 20 stores journals of a plurality of write data items to which the same address is designated into different storage areas of the cache memory 21 respectively.

Also, when the control unit 20 receives a check point command from the host 1, which contains predetermined identification information managed by the host 1, the control unit 20 generates a journal corresponding to the predetermined identification information, and stores the generated journal via the cache memory 21 to the journal storage device 26. A check point command implies such a command which is transmitted by the host 1 to the storage system 2 in order to specify a restore time instant of the journal acquiring storage device 25 based upon predetermined identification information managed by the host 1.

Further, when the control unit 20 receives a restore instruction from the host 1, which contains the above-mentioned predetermined identification information, the control unit 20 first copies the snapshot data 34 stored in the journal storage device 26 to the journal acquiring storage device 25. Subsequently, the control unit 20 sequentially reads out journals which have been recorded before the journal corresponding to the predetermined identification information contained in the restore instruction. Then, the control unit 20 writes the read journal at the write source address of the journal acquiring storage device 25 so as to restore the status of the data stored in the journal acquiring storage device 25 at the time when the predetermined identification information was recorded.

In this case, a description is made of such sequential operations that the DBMS 10 which receives the transaction process request writes and reads the data with respect to the storage system 2.

When the DBMS 10 receives a transaction process request from the user terminal 4, the DBMS 10 executes the transaction managing unit 11. The transaction managing unit 11 reads out a data which is to be updated, or to which the transaction process operation refers from the DB file 30 stored in the storage system 2, and then, stores the read data into the DB buffer 13.

When the transaction request is an update, the transaction managing unit 11 updates the read data of the DB buffer 13. Then, the transaction managing unit 11 generates a log corresponding to the update history, and stores the generated log in the log buffer 15. A log is constituted by identification information (will be referred to as "transaction identification information" hereinafter) for exclusively identifying a transaction whose log is generated, a log serial number for exclusively identifying the relevant log, data which is updated, updated data, and the like.

When the transaction process operation is committed, the transaction managing unit 11 executes the log writing unit 14 in synchronism with the committing operation. Then, the transaction managing unit 11 additionally writes the log stored in the log buffer 13 into the log file 32.

It should also be noted that in order to improve process performance, the DBMS 10 executes the DB writing unit 12 in asynchronism with the updating operation of the data stored in the DB buffer 13, and the committing operation of the transaction, and then writes the updated data of the DB buffer 13 into the DB file 30.

The DB writing unit 12 is executed when a predetermined amount or more of data is updated in the DB buffer 13, or at a check point (described later). Also, when a process operation such as a sorting operation is contained in a transaction request, the transaction managing unit 11 executes a writing process operation and a reading process operation with respect to the temporary file 33.

When the control unit 20 receives an I/O process request from the DBMS 10, in the case where the received I/O process request corresponds to a read request, the control unit 20 acquires the read data from either the physical storage device 56 or the cache memory 21, and then, transfers the acquired read data to the DBMS 10.

Also, in a case where the received I/O process request corresponds to a write request with respect to the storage device 24, the control unit 20 stores write data into the cache memory 21. In a case where the received I/O process request corresponds to a write request with respect to the journal acquiring storage device 25, the control unit 20 stores write data into the cache memory 21, and further generates a journal of the write data, and then, stores the generated journal into the cache memory 21. It should also be noted that both the write data and the journal which are stored in the cache memory 21 are written into the physical storage device 56 in asynchronism with the storing operations thereof to the cache memory 21.

Also, the DBMS 10 executes the DB writing unit 12 and the log writing unit 14 in a constant time interval, or for each of the transactions so as to write both the update data stored in the DB buffer 13 and the log stored in the log buffer 15 into the storage system 2. As previously described, the process operation for writing data stored in a buffer into the storage system 2, and timing at which this writing process operation is performed will be referred to as a check point.

Since the content of the DB buffer 13 stored in the DBMS 10 is coincident with the content of the DB file 30 stored in the storage system 2 by executing the writing process operation at the check point, the check point constitutes a base point of a recovery of the DB.

When the writing process operation executed at the check point is completed, the DBMS 10 executes the transaction managing unit 11 so as to generate a log which contains the identification information of the check point, and then to record the generated log in the log file 32.

Also, the transaction managing unit 11 writes the identification information of the check point into either the control file 31 or a header portion of the DB file 30 in order to utilize this identification information of the check point for recovering the DB.

Subsequently, while the transaction managing unit 11 defines the identification information of the check point as predetermined identification information contained in a check point command, the transaction managing unit 11 transmits this check point command to the storage system 2 so as to finish the process operation of the check point.

It should be noted that identification information of a check point contains information for exclusively identifying the check point, and a recording position of a log with the log file 32, which contains the identification information of the check point. Also, a log containing identification information of a check point contains a total number of transactions during operation at the check point and statuses of the transactions, namely information required for starting a recovery of the DB, in addition to the identification information of the check point.

When the control unit 20 receives a check point command from the DBMS 10, the control unit 20 generates a journal in correspondence with the identification information of the check point, and then stores the generated journal via the cache memory 21 into the journal storage device 26.

Figure 3:
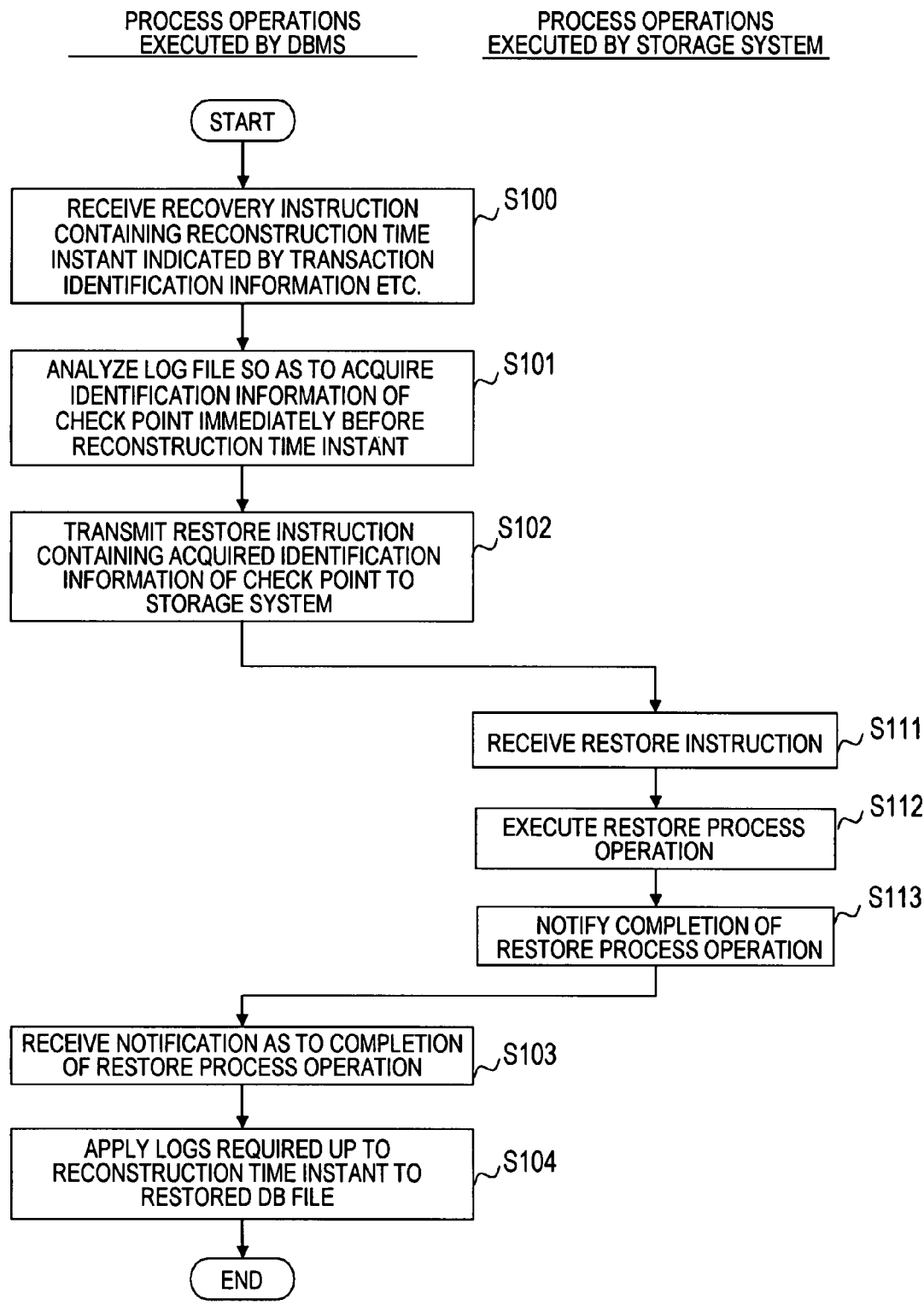
FIG. 3 is a flow chart of a recovery process of a database according to the first embodiment of this invention.

FIG. 3 is a flow chart for representing a recovery process sequential operation of the DB according to the first embodiment. A recovery process operation of the DB includes a process operation executed in the DBMS 10 which receives a recovery instruction from an administrator, and a process operation executed in the storage system 2 which receives a restore instruction from the DBMS 10. It should be noted that in the first embodiment, the following recovery process operation, which is carried out when a failure such as a logical mismatching effect occurs in the DB file 30 due to operation mistake by the administrator, will be described.

The DBMS 10 receives a recovery instruction of the DB from the administrator, the recovery instruction containing transaction identification information or a log serial number which indicate a reconstruction time instant immediately before a failure occurs (Step S100).

Upon reception of the recovery instruction, the DBMS 10 executes the log analyzing unit 16. The log analyzing unit 16 refers to the log file 32 to retrieve a log corresponding to either the received transaction identification information or the received log serial number.

The log analyzing unit 16 further analyzes the log file 32 so as to acquire a log recorded before the retrieved log, and containing identification information as to the latest check point. Then, the log analyzing unit 16 acquires the identification information of the check point contained in the acquired log as identification information of such a check point immediately before the reconstruction time instant (Step S101).

The DBMS 10 includes the acquired identification information of the check point immediately before the reconstruction time instant in a restore instruction as predetermined identification information, and transmits the resulting restore instruction to the storage system 2 (Step S102). The restore instruction contains identification information (logical storage device number etc.) of the journal acquiring storage device 25 into which both the DB file 30 and the control file 31 have been stored in addition to the identification information of the check point.

When the control unit 20 receives the restore instruction transmitted by the DBMS 10 (Step S111), the control unit 20 refers to the identification information of the journal acquiring storage device 25, which is contained in the received restore instruction. Then, the control unit 20 confirms that the journal acquisition setting operation has been executed in the journal acquiring storage device 25, and the journal of the journal acquiring storage device 25 has been stored in the journal storage device 26.

Subsequently, the control unit 20 executes a restore process operation (Step S112). Specifically, the control unit 20 first copies snapshot data 34 stored in the journal storage device 26 to the journal acquiring storage device 25. Next, the control unit 20 acquires a journal corresponding to the identification information of the check point contained in the restore instruction. Then, the control unit 20 applies a journal recorded before this acquired journal to the snapshot data 34 copied to the journal acquiring storage device 25 so as to restore data at the check point time instant.

When the restore process operation is finished, the control unit 20 notifies the completion of this restore process operation to the DBMS 10 (Step S113).

When the DBMS 10 receives the completion notification of the restore process operation from the storage system 2 (Step S103), the DBMS 10 executes the log applying unit 17. The log applying unit 17 acquires identification information of a check point recorded in the restored control file 31. Then, the log applying unit 17 applies logs defined from a log corresponding to the identification information of the acquired check point up to a log corresponding a reconstruction time instant contained in the recovery instruction to the DB file 30 stored in the restored journal acquiring storage device 25 (Step S104), and then, the process operation is finished. It should also be noted that as to the application of the logs, the identification information of the check point recorded in the header portion of the DB file 30 may be alternatively utilized.

In accordance with the first embodiment, the journals as to the log file 32 to which the logs are sequentially and additionally written and the journals as to the temporary file 33 which is not required to recover the DB are not generated. As a result, the storage capacity of the journal storage device 26 can be reduced.

Also, in the first embodiment, by carrying out a series of the DB recovery process operations shown in FIG. 3, at an arbitrary reconstruction time instant which is specified based upon the transaction identification information and the log serial number, the DB can be reconstructed at high speed under a condition in which consistency of the transactions is secured.

Second Embodiment

Figure 4:
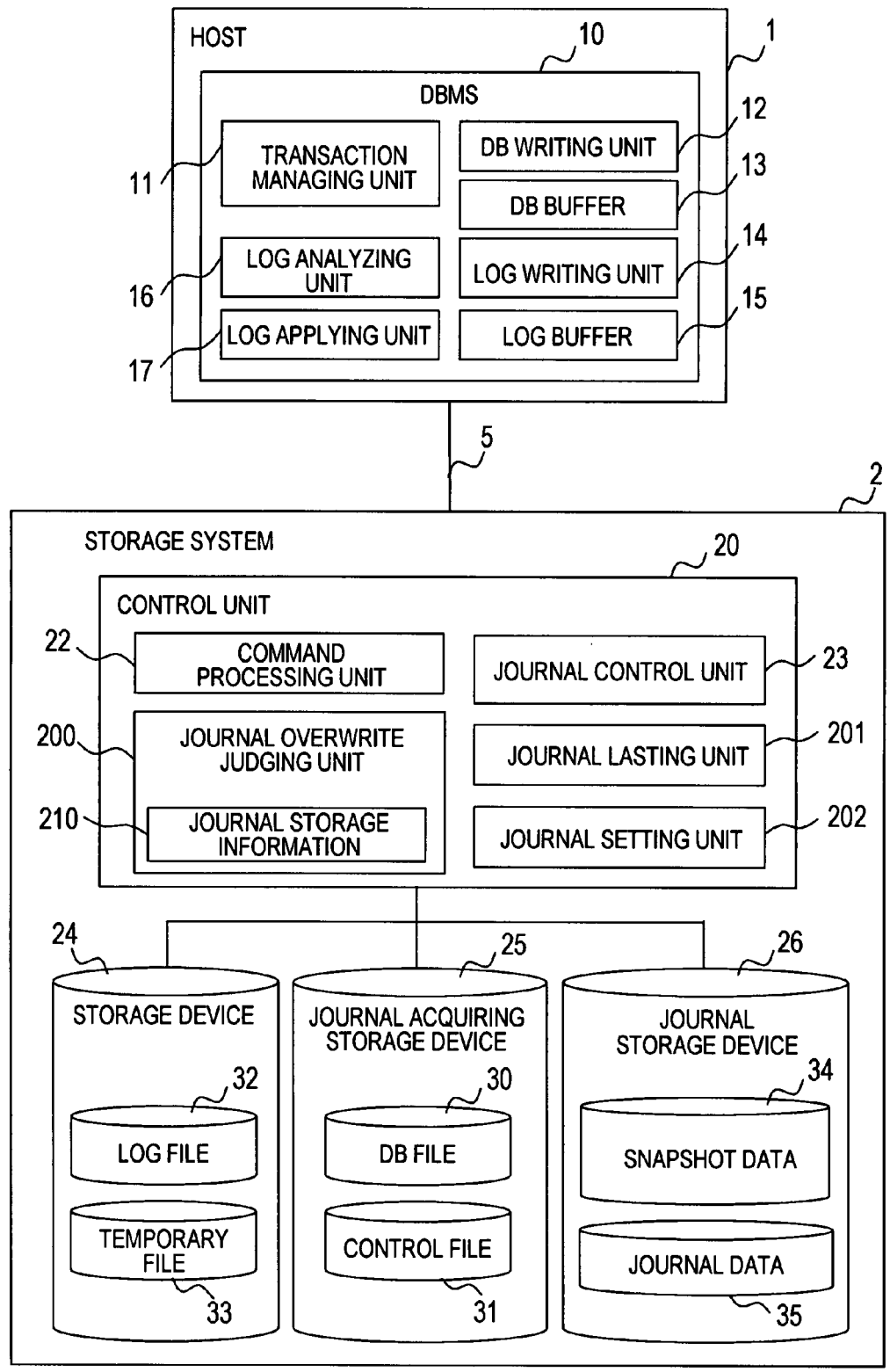
FIG. 4 is a software configuration diagram of an computer system according to a second embodiment of this invention.

FIG. 4 is a software configuration diagram of a computer system according to a second embodiment of this invention. A hardware structure of the computer system of the second embodiment is identical to that of the first embodiment.

A host 1 has the same structure as that of the first embodiment. On the other hand, in addition to the structure of the first embodiment, in the storage system 2, the control unit 20 includes the non-volatile memory 53 having management information and a program which constitutes a journal overwrite judging unit 200, a journal lasting unit 201, and a journal setting unit 202. Other arrangements of the storage system 2 are identical to those of the first embodiment.

The journal overwrite judging unit 200 includes a program for executing a process operation and journal storage information 210. The journal overwrite judging unit 200 is executed when write data with respect to the journal acquiring storage device 25 is received. Then, the journal overwrite judging unit 200 judges whether or not a journal related to a write data that the same address as that of the write data is designated is already present in the cache memory 21, and the journal present in the cache memory 21 is under overwritable status.

Also, the journal storage information 210 stores thereinto a storage designation address of write data, a storage destination address of a journal corresponding to the write data, a status of the journal, and the like. It should also be noted that a detailed description of the journal storage information 210 will be made with reference to FIG. 8.

The journal lasting unit 201 is executed when a check point command transmitted by the host 1 is received by the control unit 20. The journal lasting unit 201 changes a journal which is stored in the cache memory 21 and is under overwritable status into a journal under not-overwritable status.

The journal setting unit 202 sets both the journal overwrite judging unit 200 and the journal lasting unit 201 to either a valid status or an invalid status. The journal setting unit 202 provides an interface via the network adapter 52 to either the host 1 or the management terminal 3, the interface being used to set the journal overwrite judging unit 200 and the journal lasting unit 201 to a valid status or an invalid status.

Next, in the second embodiment, process operations executed by the DBMS 10 of the host 1 and the control unit 20 of the storage system 2 will be described.

When a write process request is received by the journal acquiring storage device 25, the control unit 20 executes the journal overwrite judging unit 200. The journal overwrite judging unit 200 judges whether or not a journal related to a write data that the same address as that of the received write data is designated is present in the cache memory 21, and further, the relevant journal is in an overwrite status.

Subsequently, the control unit 20 executes the journal control unit 23, sets the generated journal to be under an overwritable status, and overwrites the generated journal on a journal present in the cache memory 21, or stores the generated journal into a new storage area of the cache memory 21, based upon the judgement result of the journal overwrite judging unit 200.

When the control unit 20 receives a check point command from the host 1, the control unit 20 executes the journal lasting unit 201 so as to change the journal of the cache memory 21 under overwritable status into a journal under not-overwritable status.

Subsequently, the control unit 20 executes the journal control unit 23 so as to generate a journal which corresponds to predetermined identification information contained in the check point command, and then stores the generated journal into the cache memory 21.

The control unit 20 stores the journal stored in the cache memory 21 into the journal storage device 26 at predetermined timing.

It should be noted that when a storage capacity of the DB buffer 13 exceeds, the DBMS 10 also requests the storage system 2 to write data. In this case, even when the generated journal is not stored in the cache memory 21 or in the journal storage device 26, if a journal generated at a check point is held, the DB may be recovered based upon the log. As a consequence, in the second embodiment mode, a journal generated at a point other than the check point is overwritten on the cache memory 21, so that the storage capacity of the journal storage device 26 may be reduced.

The DBMS 10 applies various logs to the restored DB file 30 in order to reconstruct a status of the DB that consistency of transactions at the reconstruction time instant is secured, the applied logs being defined from a log containing identification information of a check point recorded in the control file 31 which has been similarly restored up to another log corresponding to the reconstruction time instant. It should be noted that a recovery process operation of the DB is identical to the recovery process operation of the first embodiment.

Next, a detailed description is made of process operations executed by the DBMS 10 of the host 1 and the control unit 20 of the storage system 2 in the second embodiment.

Figure 5:
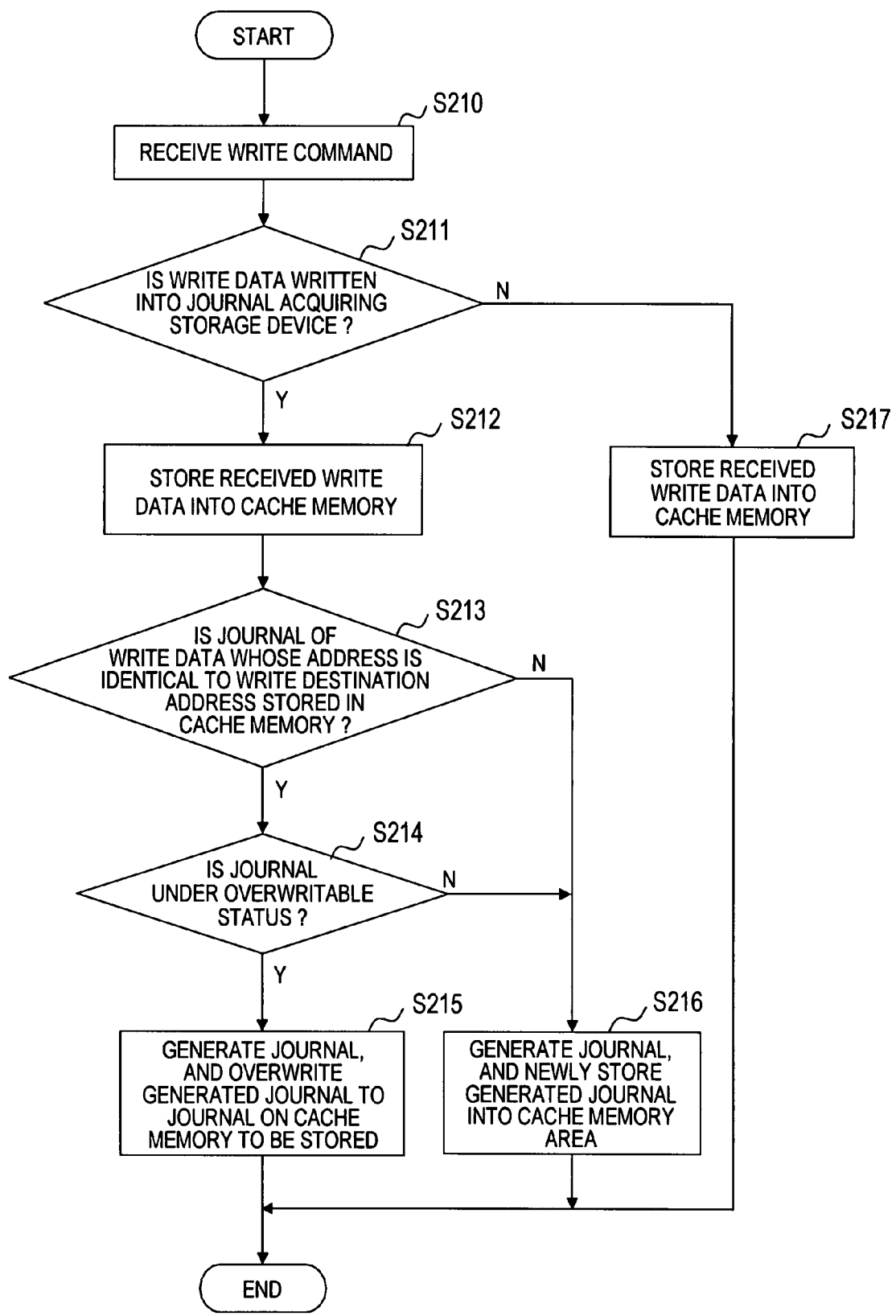
FIG. 5 is a flow chart of a process executed by a control unit when a write process request is received from a database management system according to the second embodiment of this invention.

FIG. 5 is a flow chart for describing process sequential operations executed by the control unit 20 when a write process request is received from the DBMS 10 by the control unit 20 according to the second embodiment.

When the control unit 20 receives the write process request from the DBMS 10 (Step S210), the control unit 20 judges whether or not a subject of the write process request is the journal acquiring storage device 25 (Step S211). When the subject of the write process request is not the journal acquiring storage device 25 ("N" in Step S211), the control unit 20 stores the write data contained in the write process request into the cache memory 21 (Step S217). When the writing process operation is ended, the control unit 20 notifies the completion of the writing process operation to the DBMS 10.

On the other hand, in a case that the subject of the write process request corresponds to the journal acquiring storage device 25 ("Y" in Step S211), the control unit 20 stores the transmitted write data into the cache memory 21 (Step S212).

Next, the control unit 20 refers to the journal storage information 210 to judge whether or not such a journal is present in the cache memory 21 (Step S213). This journal is related to a write data designated with the same address in which the received write data is stored.

In the case where the relevant journal is not present in the cache memory 21 ("N" in Step S213), the control unit 20 generates the journal related to the requested write data as a journal under overwritable status, and then stores the generated journal into a new storage area of the cache memory 21 (Step S216). The control unit 20 registers information related to the stored journal into the journal storage information 210, and finishes the process operation.

In the case where the relevant journal is already present in the cache memory 21 ("Y" in Step S213), the control unit 20 refers to the relevant record of the journal storage information 210 in order to judge whether or not the relevant journal is under overwritable status (Step S214). If the journal is not under overwritable status ("N" in Step S214), then the control unit 20 executes a process operation of Step S216.

If the journal is under overwritable status ("Y" in Step S214), then the control unit 20 refers to the journal storage information 210, and overwrites a journal related to the requested write data on the relevant journal stored in the cache memory 21 under overwritable status, and then, finishes the process operation (Step S215).

Figure 6:
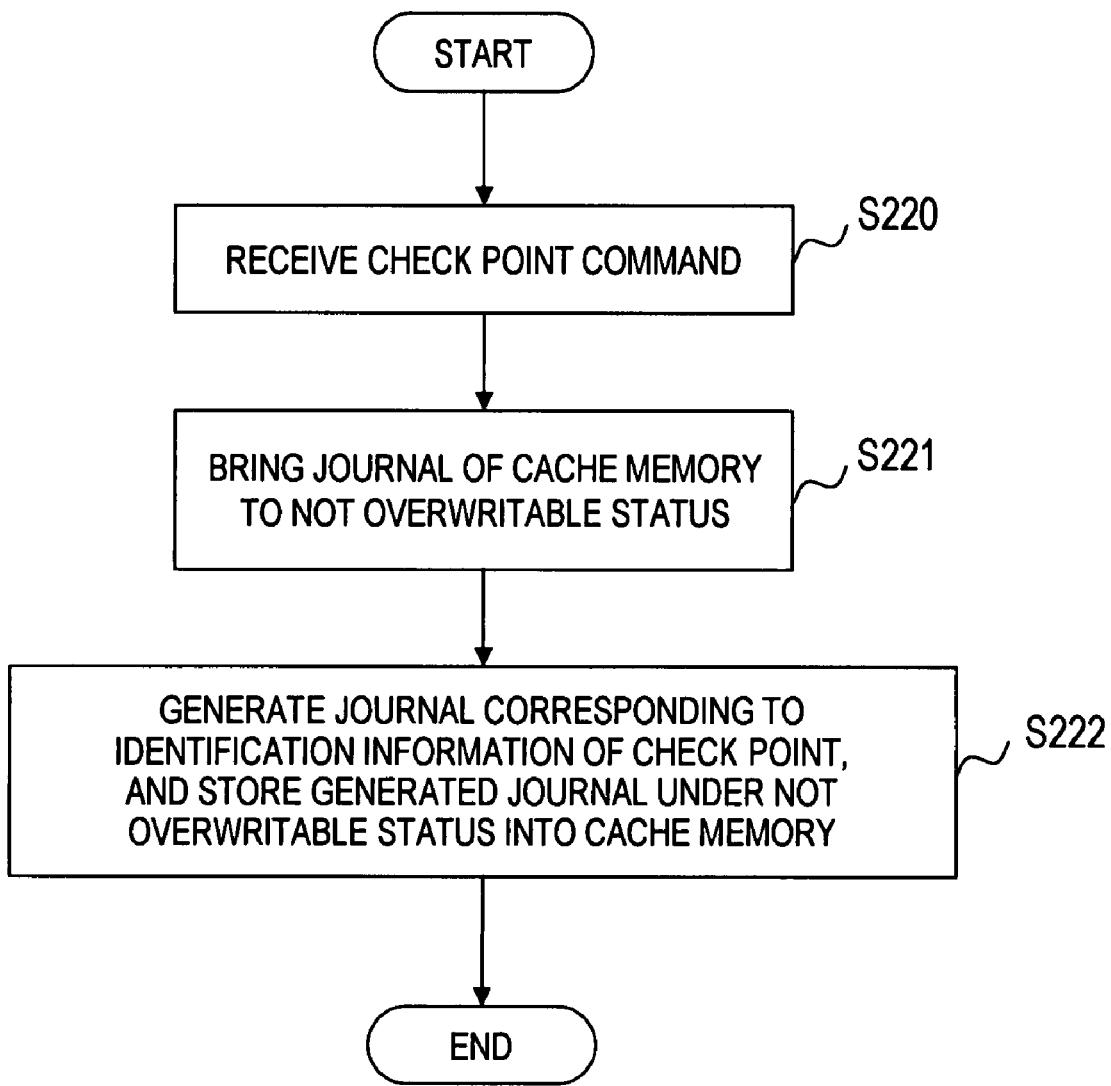
FIG. 6 is a flow chart of a process executed by the control unit when a storage system receives a check point command from a host according to the second embodiment of this invention.

FIG. 6 is a flow chart for describing a process sequential operation which is executed when the storage system 2 of the second embodiment receives a check point command from the host 1. The check point command contains identification information of a check point issued from the DBMS 10 of the host 1 when the process operation of the check point has been finished and processed as predetermined identification information.

First, the control unit 20 receives a check point command from the DBMS 10 of the host 1 (Step S220).

Then, the control unit 20 refers to and updates the journal storage information 210 to change a journal under overwritable status which is stored in the cache memory 21 into a journal under not-overwritable status (Step S221).

Next, the control unit 20 generates a journal under not-overwritable status and stores the generated journal into the cache memory 21 (Step S222). This journal corresponds to identification information of a check point which is contained in the received check point command. Further, the control unit 20 registers the information related to the generated journal into the journal storage information 210, and then finishes the process operation. As will be discussed later with reference to FIG. 7, the control unit 20 writes the journal stored in the cache memory 21 into the journal storage device 26 in an asynchronous manner.

As previously described, when the control unit 20 receives the check point command, the control unit 20 brings the journal to the not-overwritable status, so that the journal when the check point command is received can be positively written into the journal storage device 26. On the other hand, in the case where the storage capacity of the DB buffer 13 exceeds and thus the update is requested to the storage system 2, the control unit 20 stores the journal as the journal under overwritable status, and overwrites the journal whose update is requested and where the same address is designated. As a result, the storage capacity of the journal storage device 26 can be saved.

Figure 7:
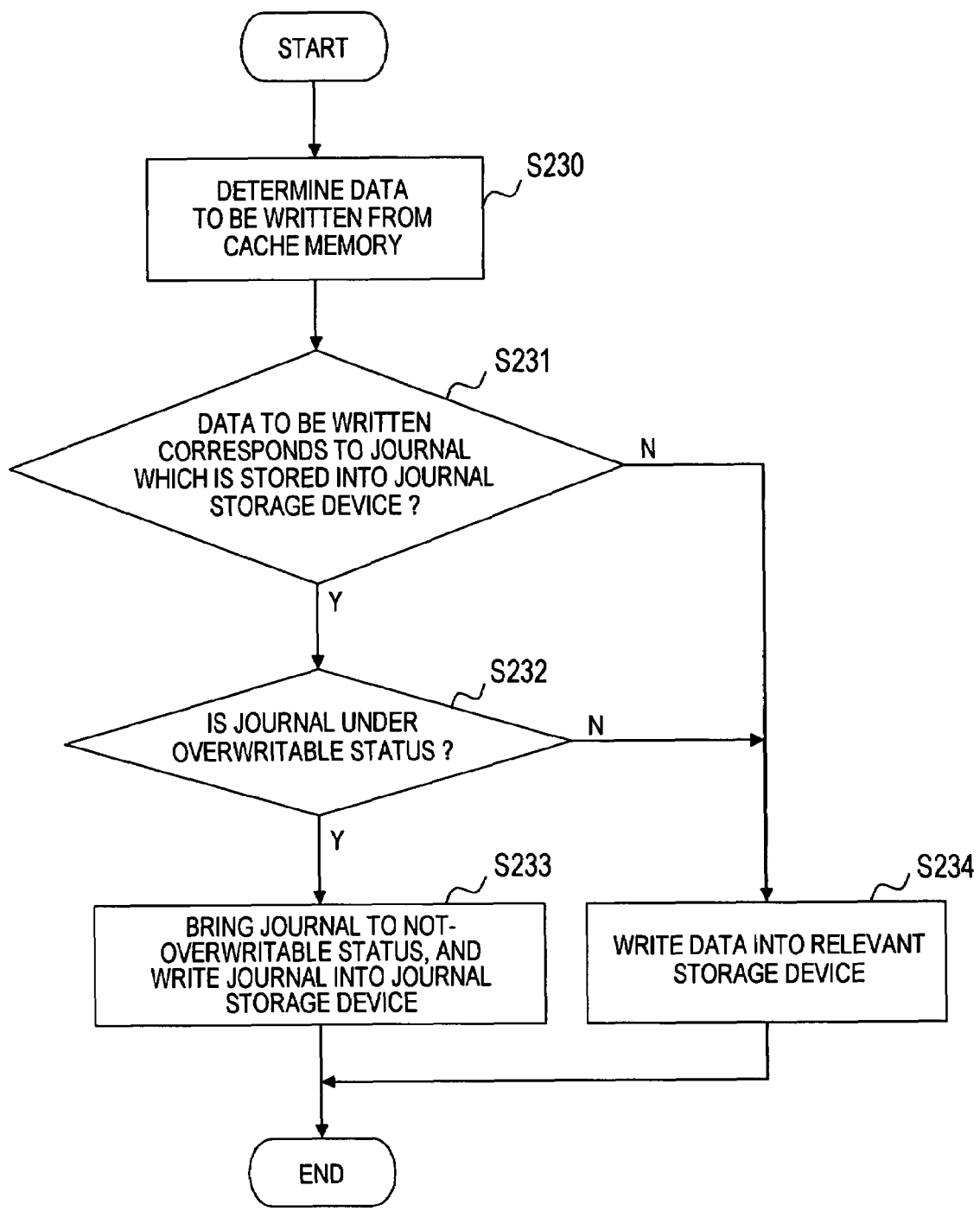
FIG. 7 is a flow chart of a process of writing dirty data stored only in a cache memory to a physical storage device according to the second embodiment of this invention.

FIG. 7 is a flow chart for describing sequential operations in which data (will be referred to as "dirty data" hereinafter) stored only in the cache memory 21 is written in the physical storage device 56 according to the second embodiment. A writing operation of dirty data is carried out at predetermined timing, for instance, at a constant time interval, or in the case where a certain amount of data or more of the cache memory 21 is updated.

The control unit 20 determines dirty data written from the cache memory 21 to the physical storage device 56 based upon a preset condition (Step S230). For instance, the control unit 20 selects a predetermined amount of dirty data which have not been accessed for a predetermined time period.

Next, the control unit 20 judges whether or not dirty data to be written corresponds to a journal to be stored in the journal storage device 26 (Step S231). When the dirty data to be written is not the journal to be stored in the journal storage device 26 ("N" in Step S231), the control unit 20 writes the dirty data into the physical storage device 56 of the storage destination, and then finishes the process operation (Step S234).

On the other hand, when the dirty data to be written corresponds to the journal to be stored in the journal storage device 26 ("Y" in Step S231), the control unit 20 refers to the journal storage information 210 in order to judge whether or not the relevant journal is under overwritable status (Step S232). In the case where the relevant journal is under not-overwritable status ("N" in Step S232), the control unit 20 executes a process operation of Step S234, whereby the relevant journal is stored in the physical storage device 56 which constitutes the journal storage device 26.

Also, in the case where the relevant journal is under overwritable status ("Y" in Step S232), the control unit 20 refers to and updates the journal storage information 210, and thus, changes the journal under overwritable status into a journal under not-overwritable status. Then, the control unit 20 stores the relevant journal into the physical storage device 56 which constitutes the journal storage device 26, and then finishes this process operation (Step S233).

It should be noted that the control unit 20 need not execute the process operation of Step S233 depending on a usable storage area amount of the cache memory 21. In other words, if there is a sufficient usable storage area in the cache memory 21, then the control unit 20 does not change the journal under overwritable status stored in the cache memory 21 into a journal under not-overwritable status. Also, by not writing this journal into the physical storage device 56, journals may be additionally overwritten, and the storage capacity of the journal storage device 26 to be used can be reduced.

Figure 8:
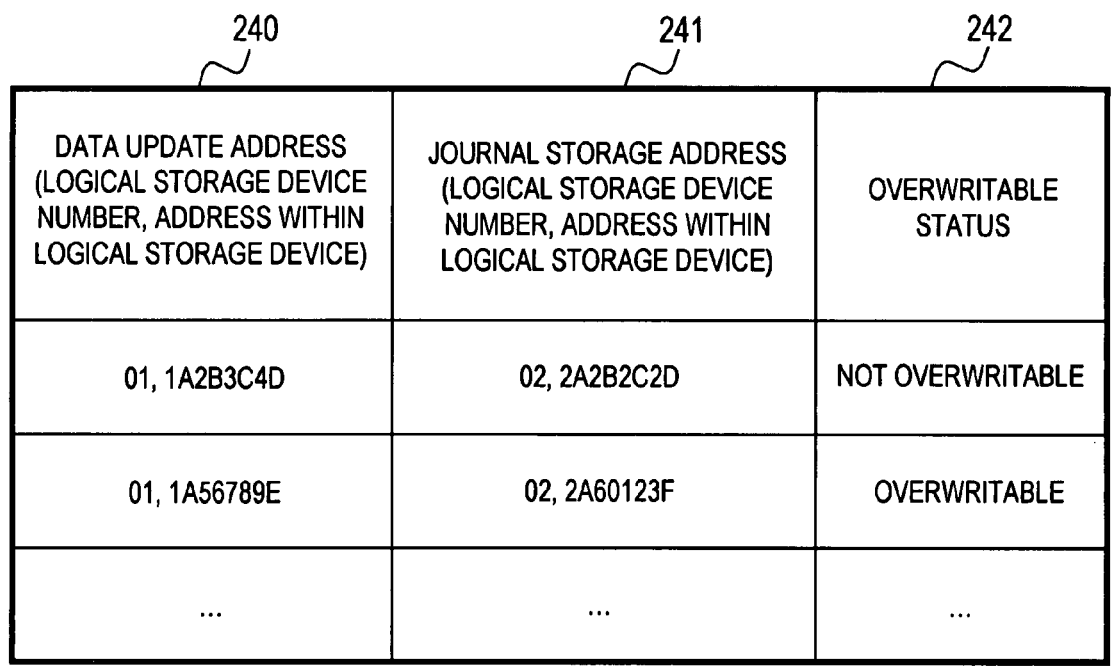
FIG. 8 is a diagram of a journal storage information of the second embodiment of this invention.

FIG. 8 is a diagram for showing one example of the journal storage information 210 of the second embodiment. The journal storage information 210 contains a data update address 240, a journal storage address 241, and an overwritable status 242.

In the data update address 240, such an address indicative of a position where write data is stored is stored. In the journal storage address 241, such an address is stored which indicates a position where a journal related to the write data is stored. The overwritable status 242 stores thereinto information as to whether or not a journal specified by the journal storage address 241 is under overwritable status.

Figure 9:
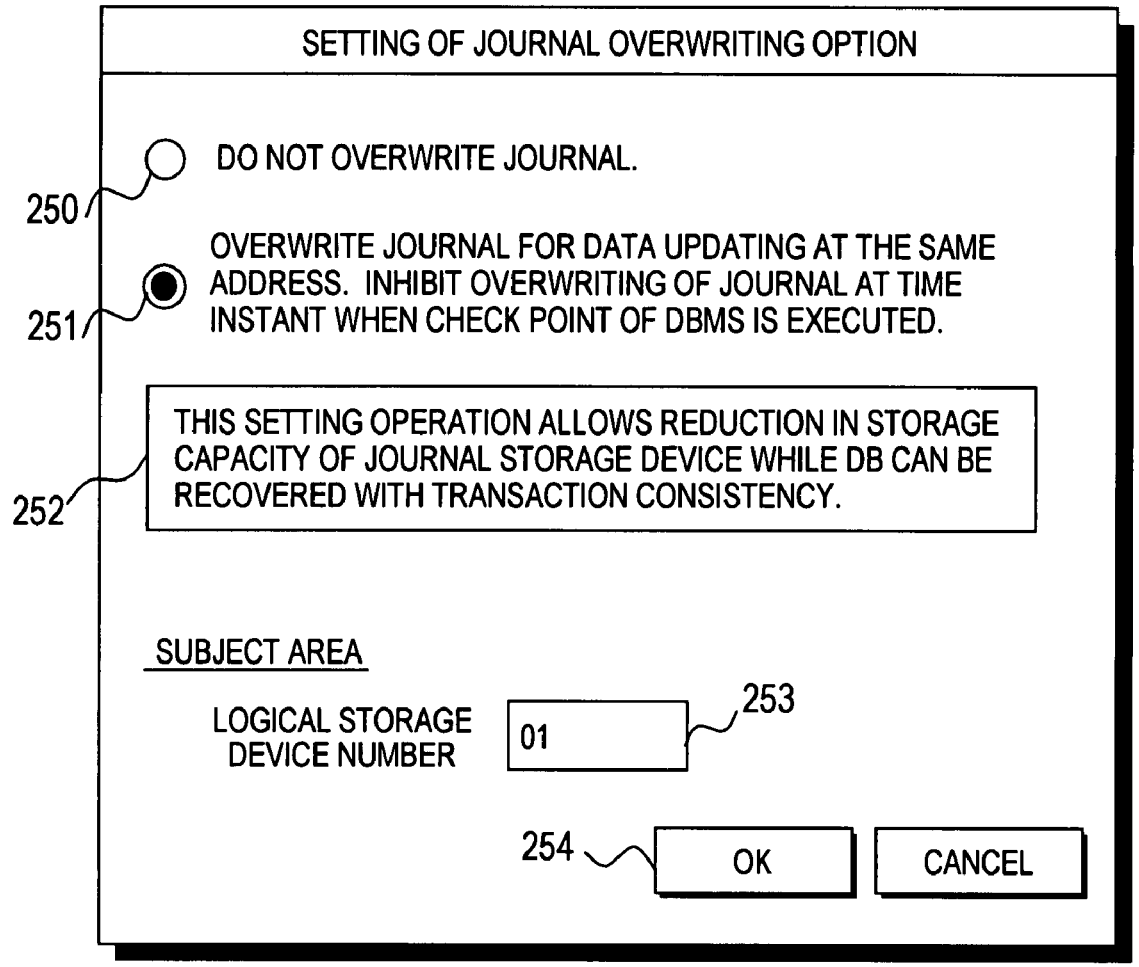
FIG. 9 is a diagram of a function setting screen according to the second embodiment of this invention.

FIG. 9 is a diagram for showing one example of a function setting screen according to the second embodiment. The function setting screen of the second embodiment corresponds to a user interface which sets valid statuses or invalid statuses of the journal overwrite judging unit 200 and the journal lasting unit 201. The function setting screen is displayed on the management terminal 3 or the like by the journal setting unit 202 of the control unit 20.

A check box 251 or a check box 250 of the function setting screen is manipulated so that the journal overwrite judging unit 200 and the journal lasting unit 201 can set a valid status or an invalid status.

The administrator can set both the journal overwrite judging unit 200 and the journal lasting unit 201 to the valid statuses with respect to a specific journal acquiring storage device 25. Specifically, the administrator manipulates the check box 251 so as to input an identification number of the journal acquiring storage device 25 to be set into a character input area 253. Then, the administrator manipulates an "OK" button 254, so that the setting content is reflected on the storage system 2. On the other hand, if the administrator selects the check box 250, then the administrator can set both the journal overwrite judging unit 200 and the journal lasting unit 201 to the invalid statuses.

It should also be noted that when the journal setting unit 202 sets both the journal overwrite judging unit 200 and the journal lasting unit 201 to the valid statuses, a message indicative of a function or an effect may be alternatively displayed on the display unit 252. For example, as shown in FIG. 9, such a message may be displayed, which indicates that while the DB can be recovered with transaction consistency, the storage capacity of the journal storage device 26 can be reduced.

According to the second embodiment, when a plurality of writing process operations designating the same address are requested, a journal is overwritten on the cache memory 21, so that the storage capacity required to record the journals can be reduced. In particular, this technical idea becomes effective in the case where data stored in the physical storage device 56 constituting a journaling subject is continuously updated.

Moreover, according to the second embodiment, the journal stored in the physical storage device 56 is not overwritten, but the journal is overwritten on the cache memory 21. As a result, as to the journal overwriting process operation, the load with respect to the storage system 2 can be reduced.

Third Embodiment

Figure 10:
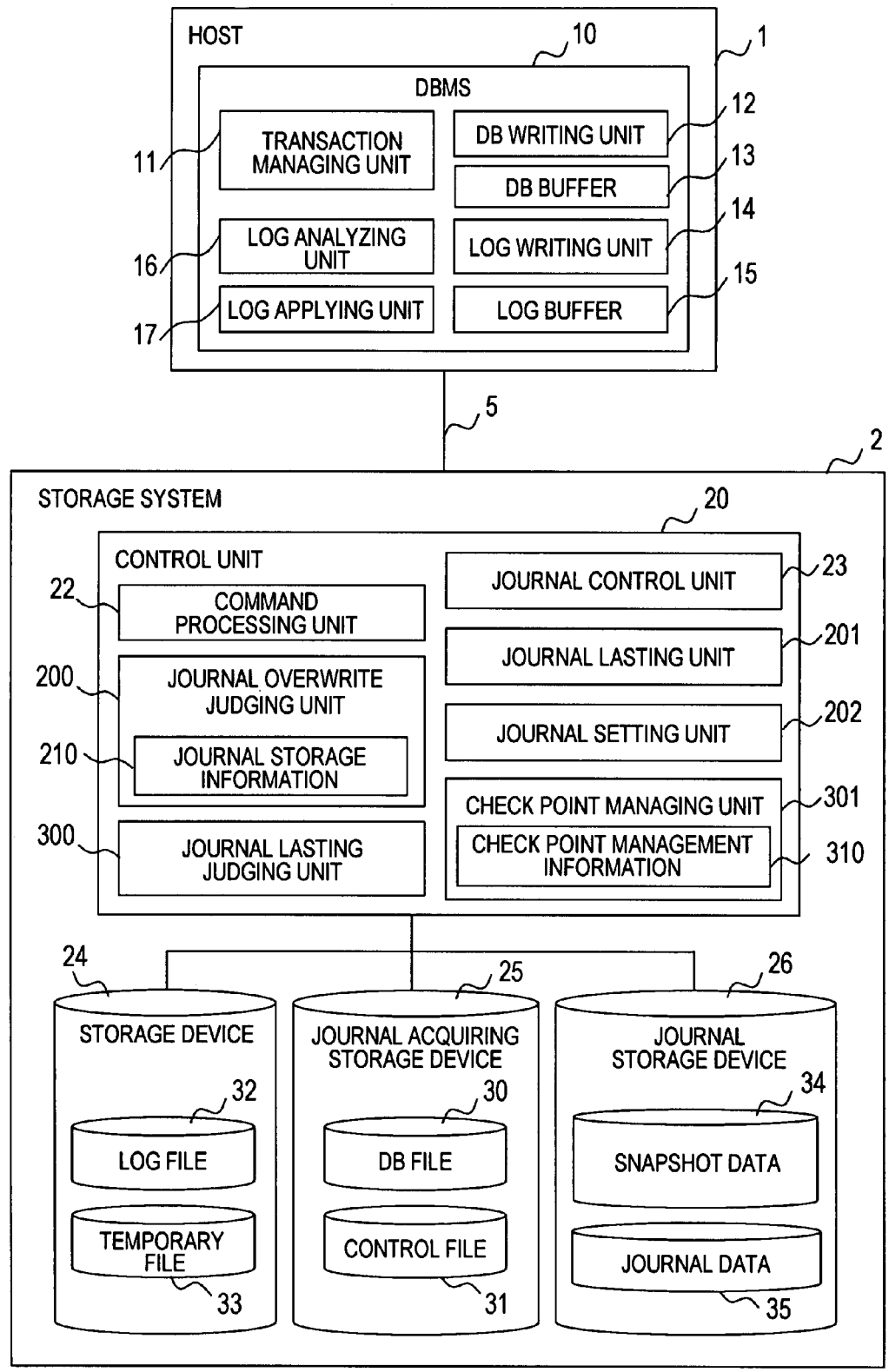
FIG. 10 is a software configuration diagram of an computer system according to a third embodiment of this invention

FIG. 10 is a software configuration diagram of a computer system according to a third embodiment of this invention. A hardware structure of the computer system of the third embodiment is identical to that of the first embodiment.

A host 1 has the same structure as that in the first embodiment. On the other hand, in addition to the structure of the second embodiment, in the storage system 2, the control unit 20 is equipped with the non-volatile memory 53 which stores thereinto management information and a program which constitutes a journal lasting judging unit 300 and a check point managing unit 301. Other arrangements of the storage system 2 are identical to those of the second embodiment.

The journal lasting judging unit 300 is carried out when the control unit 20 receives a check point command from the host 1. The journal lasting judging unit 300 judges whether or not an amount of journals under overwritable statuses stored in the cache memory 21 is equal to or larger than a predetermined threshold value, and whether or not, an empty storage capacity of the journal storage device 26 is equal to or larger than a predetermined threshold value.

The check point managing unit 301 is composed of a program for executing a program, and check point management information 310. The check point managing unit 301 manages a received check point as either a valid status or an invalid status based upon a judgement result of the journal lasting judging unit 300.

The check point management information 310 stores thereinto information of check points corresponding to journals. A detailed content of this check point management information 310 will be described in detail with reference to FIG. 13.

Also, the control unit 20 provides an interface to either the host 1 or the management terminal 3 via the network adaptor 52 by executing the program which constitutes the check point managing unit 301. The interface is used to refer to information registered in the check point management information 310. A detailed content of the interface will be described later with reference to FIG. 14.

Similar to the second embodiment, the journal setting unit 202 sets both the journal overwrite judging unit 200 and the journal lasting unit 201 to either a valid status or an invalid status. In the third embodiment, the journal setting unit 202 can set both a threshold value as to an amount of journals under overwritable status stored in the cache memory 21, and a threshold value as to the empty storage capacity of the journal storage device 26, which are used in a judging operation by the journal lasting judging unit 300. Further, the journal setting unit 202 sets both the journal lasting judging unit 300 and the check point managing unit 301 to either a valid status or an invalid status.

The journal setting unit 202 provides an interface for setting an item such as a threshold value required for the judgement by the journal lasting judging unit 300, and another interface for setting both the journal lasting judging unit 300 and the check point managing unit 301 to either the valid status or the invalid status via the network adaptor 52 to either the host 1 or the management terminal 3. It should be noted that a detailed content of the interfaces will be described later with reference to FIG. 15.

Next, a description is made of an outline as to process operations executed by the DBMS 10 of the host 1 and the control unit 20 of the storage system 2 in the third embodiment.

When the control unit 20 receives a check point command from the host 1, the control unit 20 executes the journal lasting judging unit 300. The journal lasting judging unit 300 judges whether or not a journal stored in the cache memory 21 is to be lasted at the time point when the check point command is received, based upon an amount of journals under overwritable statuses stored in the cache memory 21, and an empty storage capacity of the journal storage device 26. When the control unit 20 judges that a journal stored in the cache memory 21 is not to be lasted, the control unit 20 executes the check point managing unit 301 so as to manage the received check point as the invalid check point.

On the other hand, when the control unit 20 judges that a journal stored in the cache memory 21 is to be lasted, the control unit 20 executes the journal lasting unit 201 so as to change the journal under overwritable status in the cache memory 21 into a journal under not-overwritable status.

Subsequently, the control unit 20 executes the journal control unit 23 so as to generate a journal which corresponds to the identification information of the check point contained in the check point command, and then, stores the generated journal into the cache memory 21 as a journal under not-overwritable status. Finally, the control unit 20 executes the check point managing unit 301 so as to mange the received check point as the valid check point.

It should also be noted that the control unit 20 stores the journal stored in the cache memory 21 into the journal storage device 26 at a predetermined timing.

When the DBMS 10 receives a recovery instruction of the DB from the administrator, which contains a reconstruction time instant, the DBMS 10 executes the log analyzing unit 16 so as to analyze the log file 32, so that the DBMS 10 acquires identification information of the check point immediately before the reconstruction time instant. Then, the DBMS 10 inquires the storage system 2 as to whether or not the acquired check point is valid.

Upon receipt of the inquiry as to the identification information of the check point from the DBMS 10, the control unit 20 executes the check point managing unit 301. When the received check point is valid, the check point managing unit 301 responds to the DBMS 10 that the identification information of the received check point is valid. On the other hand, when the received check point is invalid, the check point managing unit 301 responds to the DBMS 10 in such a manner that identification information of a latest valid check point acquired before the time instant when the identification information of the received check point was registered is sent to the DBMS 10.

When the DBMS 10 receives the identification information of the valid check point from the storage system 2, the DBMS 10 transmits a restore instruction containing the identification information of the received check point to the storage system 2. Then, the storage system 2 applies a journal based upon the identification information of the received check point so as to restore the DB file 30. After that, the DBMS 10 applies the logs up to the reconstruction time instant to the restored DB file 30 by the log applying unit 17 in order to reconstruct the DB at the reconstruction time instant.

Next, a detailed description is made of the process operations executed by the DBMS 10 of the host 1 and the control unit 20 of the storage system 2 in the third embodiment.

Figure 11:
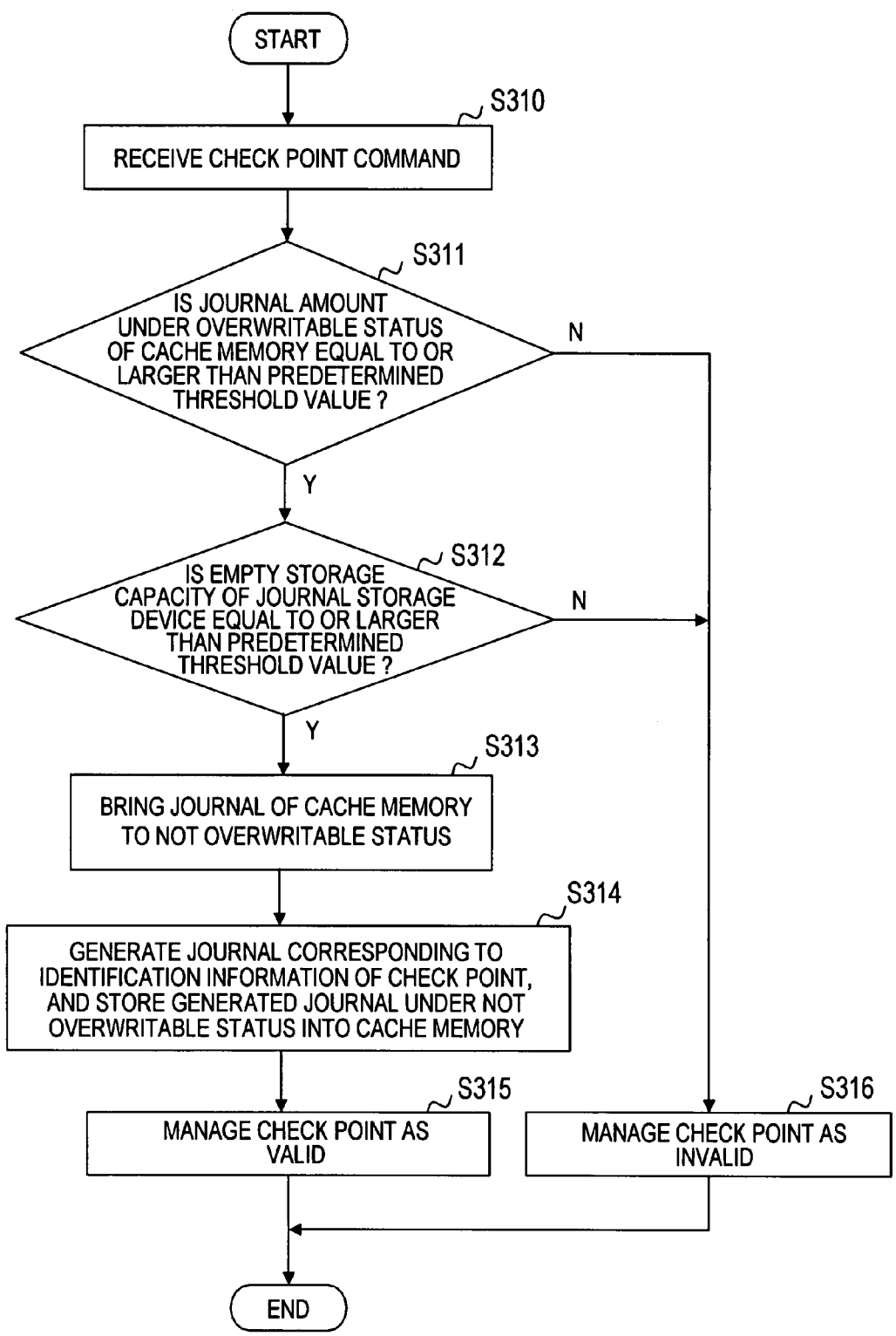
FIG. 11 is a flow chart of a process executed by a control unit when a storage system receives a check point command from a host according to the third embodiment of this invention.

FIG. 11 is a flow chart for describing sequential process operations executed when the storage system 2 receives a check point command from the host 1 according to the third embodiment. A check point command is issued from the DBMS 10 of the host 1 when the process operation of the check point is finished, and contains identification information of the processed check point as predetermined identification information.

The control unit 20 first receives a check point command from the DBMS 10 of the host 1 (Step S310).

The control unit 20 refers to the journal storage information 210 so as to judge whether or not an amount of journals under overwritable statuses stored in the cache memory 21 is equal to or lager than a predetermined threshold value (Step S311).

In the case where the amount of the relevant journals is not equal to or larger than the predetermined threshold value ("N" in Step S311), the control unit 20 refers to and updates the check point management information 310 in order to manage the received check point as an invalid check point (Step S316), and then finishes the process operation.

On the other hand, in the case where the amount of the journals under overwritable statuses stored in the cache memory 21 is equal to or larger than the predetermined threshold value ("Y" in Step S311), the control unit 20 judges whether or not an empty storage capacity of the journal storage apparatus 26 is equal to or larger than a predetermined threshold value (Step S312). When the empty storage capacity of the journal storage device 26 is not equal to or larger than the predetermined threshold value ("N" in Step S312), the control unit 20 manages the received check point as an invalid check point (Step S316), and then finishes the process operation.

When the empty storage capacity of the journal storage device 26 is equal to or larger than the predetermined threshold value ("Y" in Step S312), the control unit 20 refers to and updates the journal storage information 210 so as to set the journals under overwritable statuses stored in the cache memory 21 to journals under not-overwritable statuses (Step S313).

Next, the control unit 20 generates a journal under not-overwritable status in correspondence with the identification information of the check point contained in the received check point command, and then stores the generated journal into the cache memory 21 (Step S314). The control unit 20 registers the information of the generated journal in the journal storage information 210.

Subsequently, the control unit 20 refers to and updates the check point management information 310 in order to manage the received check point as a valid check point (Step S315), and then finishes the process operation.

It should be noted that similar to the second embodiment, the control unit 20 writes the journals in the cache memory 21 into the journal storage device 26 in an asynchronous manner.

Figure 12:
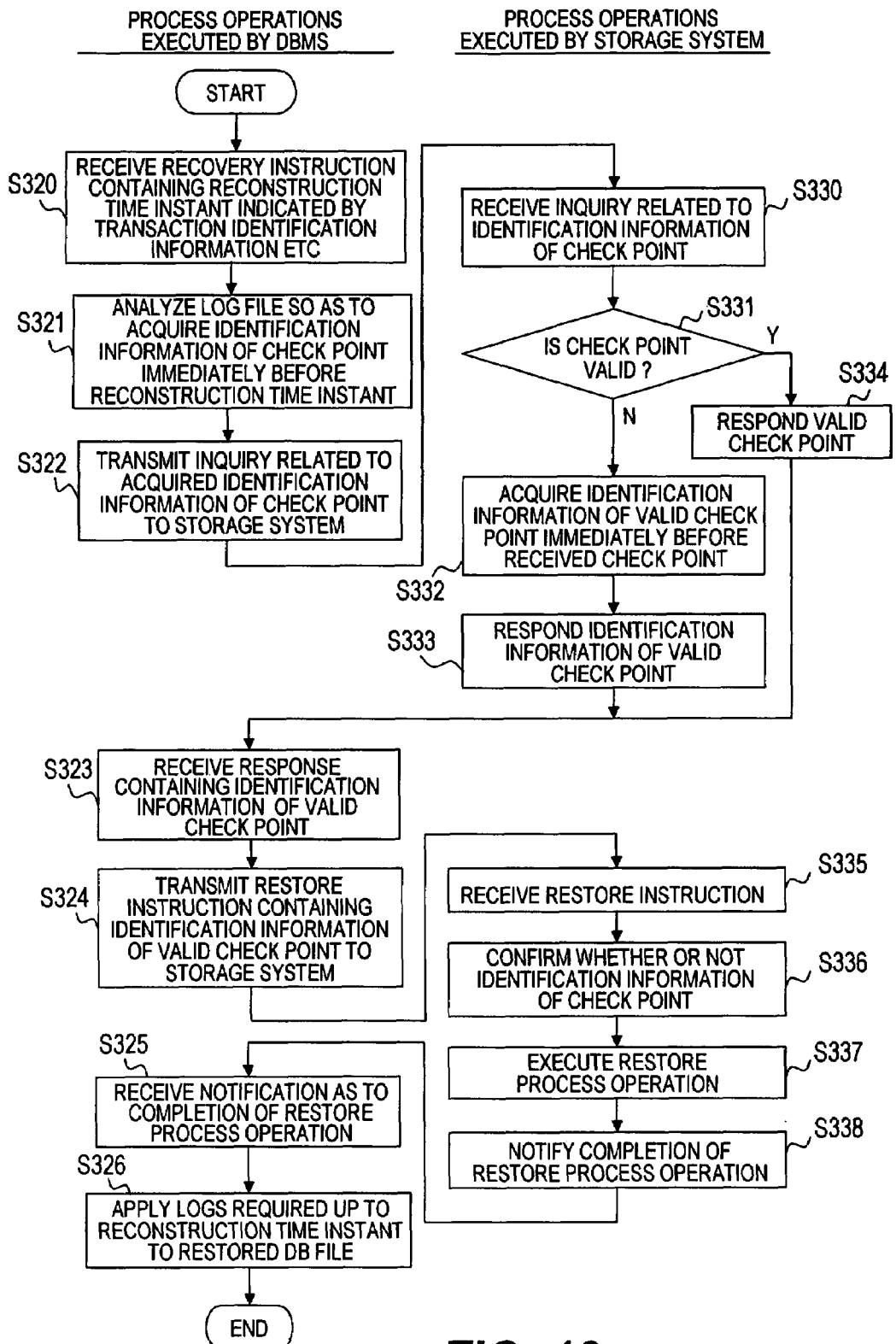
FIG. 12 is a flow chart of a recovery process of a database according to the third embodiment of this invention.

FIG. 12 is a flow chart for describing a sequence of a recovery process operation of the DB in the third embodiment. The recovery process operation is composed of a process operation executed in the DBMS 10 which receives a recovery instruction from the administrator, and a process operation executed by the storage system 2 which receives the restore instruction and an inquiry as to identification information of a check point from the DBMS 10.

The DBMS 10 receives a recovery instruction of the DB from the administrator, while the recovery instruction contains either transaction identification information or a log serial number which indicates a reconstruction time instant immediately before a failure occurrence (Step S320).

Upon receipt of the recovery instruction, the DBMS 10 executes the log analyzing unit 16. The log analyzing unit 16 refers to the log file 32 in which logs up to the current time point have been recorded in order to retrieve a log corresponding to either the received transaction identification information or the received log serial number.

The log analyzing unit 16 further analyzes the log file 32 so as to acquire such a log which has been recorded before the retrieved log, and contains identification information as to the latest check point. Then, the log analyzing unit 16 acquires the identification information of the check point contained in the acquired log as identification information of a check point immediately before the reconstruction time instant (Step S321).

The DBMS 10 inquires the valid check point to the storage system 2 based upon the acquired identification information of the check point (Step S322).

When the control unit 20 receives the inquiry as to the identification information of the check point from the DBMS 10 (Step S330), the control unit 20 refers to the check point management information 310 in order to confirm that the identification information of the received check point is being managed. Then, the control unit 20 judges whether or not a check point specified by the received identification information of the check point is valid (Step S331).

In the case where the specified check point is valid ("Y" in Step S331), the control unit 20 makes a response that the specified check point is valid to the DBMS 10 (Step S334).

On the other hand, in the case where the specified check point is invalid ("N" in Step S331), the control unit 20 refers to the check point management information 310 so as to acquire identification information of a valid check point closest to the above-mentioned invalid check point (Step S332). Specifically, the control unit 20 acquires identification information of such a check point before the time instant when the identification information of the received check point is registered and closest to the above-mentioned invalid check point from the identification information of other check points executed in the same DB as the DB where the received check point has been executed. Then, the control unit 20 transmits the identification information as to the acquired valid check point to the DBMS 10 (Step S333).

When the DBMS 10 receives the identification information of the valid check point from the storage system 2 (Step S323), the DBMS 10 includes the identification information of the acquired check point in a restore instruction as predetermined identification information, and then transmits the restore instruction to the storage system 2 (Step S324).

When the control unit 20 receives the restore instruction transmitted by the DBMS 10 (Step S335), the control unit 20 refers to the identification information of the journal acquiring storage device 25, which is contained in the received restore instruction. Then, the control unit 20 confirms that the journal acquisition setting operation is executed in the journal acquiring storage device 25, and that the journal of the journal acquiring storage device 25 has been stored in the journal storage device 26. Also, the control unit 20 refers to the check point management information 310 in order to confirm that the check point designated by the received restore instruction is valid (Step S336).

Subsequently, the control unit 20 executes a restore process operation (Step S337). Specifically, the control unit 20 acquires such a journal corresponding to the identification information of the check point which is predetermined identification information contained in the restore instruction. Then, the control unit 20 applies such a journal which has been recorded before the acquired journal to the snapshot data 34 copied to the journal acquiring storage device 25 so as to restore data at the check point time instant. When the restore process operation is finished, the control unit 20 notifies the completion of this restore process operation to the DBMS 10 (Step S338).

When the DBMS 10 receives the completion notification as to the restore process operation from the storage system 2 (Step 325), the DBMS 10 executes the log applying unit 17. The log applying unit 17 acquires identification information of a check point recorded in the restored control file 31. Then, the log applying unit 17 applies various logs from a log corresponding to the identification information of the acquired check point up to a log corresponding a reconstruction time instant contained in the recovery instruction to the DB file 30 stored in the restored journal acquiring storage device 25 (Step S326), and then, the process operation is finished.

FIG. 13 is a diagram for showing one example of the check point management information 310 of the third embodiment. The check point management information 310 contains check point identification information 340, a journal storage address 341, time 342, and journal lasting 343.

The check point identification information 340 stores thereinto an identifier of a check point to be managed. The journal storage address 341 stores therein an address at which a journal corresponding to the check point to be managed has been stored.

The time 342 stores thereinto a time when the journal corresponding to the check point to be managed is generated. The journal lasting 343 stores thereinto an indication of whether the check point to be managed is valid or invalid.

FIG. 14 is a diagram for showing one example of a check point management information display screen of the third embodiment. The check point management information display screen corresponds to a screen (user interface) which is displayed on either the host 1 or the management terminal 3 for inquiry of a content of a check point registered in the check point management information 310. The check point management information display screen is provided by the control unit 20 executing a program which constitutes the check point managing unit 301.

The check point management information display screen is substantially identical to information which is stored in the check point management information 310. Specifically, check point identification information 350, a check point execution logical storage device number 351, a check point identification information storing logical storage device number 352, time 353, and a check point status 354 are displayed on the check point management information display screen.

The check point identification information 350 corresponds to identification information of a check point registered in the check point management information 310. The check point execution logical storage device number 351 is a number of a logical storage device into which a DB where a check point has been executed is stored.

The check point identification information storing logical storage device number 352 corresponds to a number of a logical storage device into which a journal corresponding to identification information of a check point is stored. The time 353 corresponds to such a time when the journal corresponding to the identification information of the check point is generated. The check point status 354 corresponds to information for indicating whether the check point is valid or invalid.

FIG. 15 is a diagram for showing one example of a function setting screen of the third embodiment. The function setting screen of the third embodiment corresponds to a user interface for setting the valid status or invalid status of the journal lasting judging unit 300 and the check point managing unit 301. The function setting screen is displayed on either the host 1 or the management terminal 3 by the journal setting unit 202 of the control unit 20. Similar to the function setting screen of the second embodiment shown in FIG. 9, the function setting screen can set the valid status or invalid status of the journal overwrite judging unit 200 and the journal lasting unit 201.

Both the journal lasting judging unit 300 and the check point managing unit 301, and both the journal overwrite judging unit 200 and the journal lasting unit 201 are set to either valid or invalid by selecting a check box 362, a check box 361, and a check box 360. At this time, the identification number of the journal acquiring storage device 25 is inputted to a character input area 364, so that the journal acquiring storage device 25 to be set is designated. Then, by manipulating an "OK" button 367, the setting content is reflected on the storage system 2.

When the administrator selects the check box 362, the administrator can set the journal lasting judging unit 300, the check point managing unit 301, the journal overwrite judging unit 200, and the journal lasting unit 201 valid. At this time, both the threshold value as to the amount of the journals under overwritable status stored in the cache memory 21 and the threshold value as to the empty storage capacity of the journal storage device 26 which are required in the process operation of the journal lasting judging unit 300, can be inputted to the character input areas 365 and 366 to make the designation.

Also, when the administrator selects the check box 361, the administrator can set both the journal lasting judging unit 300 and the check point managing unit 301 invalid, and both the journal overwrite judging unit 200 and the journal lasting unit 201 valid.

Further, when the administrator selects the check box 360, the administrator can set the journal lasting judging unit 300, the check point managing unit 301, the journal overwrite judging unit 200, and the journal lasting unit 201 invalid.

It should be noted that as to the function setting screen, the display portion 363 may display thereon such a message that when both the journal lasting judging unit 300 and the check point managing unit 301 are set to be valid, although the storage capacity of the journal storage device 26 can be reduced while the recovering operation of the DB with the transaction consistency can be realized, there are some possibilities that the processing performance of the DB recovery may be adversely influenced.

Similar to the second embodiment, according to the third embodiment, the journals of the write data designated with the same address are overwritten on the cache memory 21, so that the storage capacity of the journal storage device 26 can be reduced.

Also, in addition to the effects of the second embodiment, according to the third embodiment, the check point command is invalidated depending on the status of the cache memory 21 and the empty storage capacity of the journal storage device 26, and the journal is further overwritten. As a consequence, in the case where the same data is continuously updated in the DB file 30, the storage capacity of the journal storage device 26 can be remarkably reduced.

Moreover, according to the third embodiment, since the log file 32 is stored in the storage device 24 which does not acquire the journal, all of the change histories of the DB file 30 are recorded irrespective of whether or not the restore process operation is carried out. As a consequence, even if the DB file 30 is not restored at the time instant when the latest check point is processed with respect to the reconstruction time instant, the DBMS 10 can apply the logs required up to an arbitrary reconstruction time instant to the restored DB file 30.

As a consequence, in the third embodiment, the judgement is made as to whether or not the journal stored in the cache memory 21 is to be written in the physical storage device 56 based upon, the amount of the journals under overwritable statuses stored in the cache memory 21 and the empty storage capacity of the journal storage device 26. As described above, the executions of the writing process operations of the journals with respect to the physical storage device 56 are thinned, so that the storage capacity of the journal storage device 26 can be further reduced as compared with the second embodiment.

As described above, this invention can be applied to such a computer system in which, in order to recover a database at high speed, although a high-speed restore operation can be carried out with employment of journals generated in the storage system, a reduction of a storage capacity required for recording the journals is desired. More specifically, this invention may be suitably applied to an OLTP-purpose computer system in which a large amount of logs are outputted, and the same data is continuously updated in a database.

While the present invention has been described in detail and pictorially in the accompanying drawings, the present invention is not limited to such detail but covers various obvious modifications and equivalent arrangements, which fall within the purview of the appended claims.

What is claimed is:

1. A storage system, which is coupled to a computer that implements a database management system having a managing unit for recording a log in a log file stored in the storage system in correspondence with identification information of a generated check point when a check point is generated, for recording the identification information of the generated check point in the control file, and for notifying such a fact that the check point has been generated to the storage system in combination with the identification information of the check point; a log analyzing unit for, in case of which the log analyzing unit receives a recovery instruction including a reconstruction time instant, retrieving a log corresponding to the reconstruction time instant included in the recovery instruction from the log file to acquire a log which has been recorded before a time instant when the retrieved log corresponding to the reconstruction time instant was recorded and includes identification information of the latest check point, and transmitting the identification information of the check point included in the acquired log to the storage system in combination with the restore instruction; and a log applying unit for applying the log corresponding to the identification information of the check point recorded in the control file restored by the storage system up to the log corresponding to the reconstruction time instant with respect to the database file restored by the storage system, the storage system comprising:

a control unit for processing an access request transmitted from the computer;
a first storage device for storing thereinto data; and
a second storage device for storing thereinto a journal corresponding to an update history of the data stored in the first storage device, wherein:
the control unit comprises:
a cache memory for temporarily storing thereinto data and the journal which are transmitted and received between the storage system and the computer;
a journal control unit operated for, in case of which the control unit receives an update instruction with respect to the data stored in the first storage device, setting the journal as a journal under overwrite status to newly generate a journal;
a journal overwrite judging unit for, in case of which the control unit receives an update instruction with respect to the data stored in the first storage device, judging whether or not the journal corresponding to the same address generated by updating data at an address identical to the address where the data to be updated is stored has already been stored in the cache memory and is under overwritable status; and
a journal lasting unit for, in case of which the control unit receives a predetermined instruction including predetermined identification information from the computer, which specifies a time instant when the data stored in the first storage device is restored, changing the journal under overwritable status stored in the cache memory into a journal under not-overwritable status;
the control unit writes the data stored in the cache memory in order to reflect the data in one of the first storage device and the second storage device at predetermined timing;
in case of which the journal control unit receives an update instruction with respect to the data stored in the first storage device and in case of which the journal corresponding to the same address has already been stored in the cache memory and is under overwritable status, the journal control unit overwrites the newly generated journal on the journal corresponding to the same address, and in case of which the journal corresponding to the same address is not stored in the cache memory, or in case of which the journal corresponding to the same address is under not-overwritable status, the journal control unit stores the newly generated journal into a new area of the cache memory;
in case of which the journal control unit receives the predetermined instruction from the computer, the journal control unit generates a journal under not-overwritable status corresponding to predetermined identification information included in the predetermined instruction and stores the generated journal into the cache memory after the process operation executed by the journal lasting unit; and
in case of which the journal control unit receives a restore instruction including the predetermined identification information from the computer, the journal control unit restores the data stored in the first storage device by employing a journal recorded in the second storage device before the journal corresponding to the predetermined identification information included in the received restore instruction.

2. The storage system according to claim 1, wherein:
the computer executes the database management system;
the database management system arranges a database for storing thereinto data to be managed in the first storage device;
in case of which a check point which constitutes a base point of a reconstruction of the database is generated, the database management system transmits the predetermined instruction to the storage system while identification information of the check point is employed as the predetermined identification information; and
in case of which the database is reconstructed, the database management system transmits the restore instruction to the storage system while the identification information of the check point is employed as the predetermined identification information.

3. The storage system according to claim 1, wherein in case of which a journal stored in the cache memory is written into the second storage device at the predetermined timing by the control unit and in case of which the journal stored in the cache memory is under overwritable status, the journal lasting unit changes the journal stored in the cache memory into a journal under not-overwritable status.

4. The storage system according to claim 1, wherein:
the control unit further comprises a journal setting unit for setting a function of the storage system;
the journal setting unit provides an interface which is inputted to set a function of the journal lasting unit and a function of the journal overwrite judging unit to be one of valid and invalid; and
the journal setting unit sets the function of the journal lasting unit and the function of the journal overwrite judging unit to be one of valid and invalid.

5. The storage system according to claim 1, wherein:
the control unit further comprises:
a journal lasting judging unit for judging whether or not an amount of the journals under overwritable statuses stored in the cache memory is larger than a predetermined threshold value and an empty storage capacity of the second storage device is larger than a predetermined threshold value in case of which the predetermined instruction is received from the computer; and
a check point managing unit for setting the received predetermined instruction to be one of valid and invalid based upon the judgment result made by the journal lasting judging unit;
the journal lasting unit changes the journal under overwritable status stored in the cache memory into a journal under not-overwritable status based upon the judgment result made by the journal lasting judging unit;
in case of which the journal control unit receives the restore instruction from the computer, the journal control unit judges whether or not a predetermined instruction which is specified by predetermined identification information included in the received restore instruction is valid; and
in case of which the specified predetermined instruction is valid, the journal control unit reconstructs the data stored in the first storage device by employing a journal recorded in the second storage device before the journal corresponding to the predetermined identification information included in the received restore instruction.

6. The storage system according to claim 5, wherein:
the control unit further comprises a journal setting unit for setting a function of the storage system;
the journal setting unit provides an interface which is inputted a threshold value for the amount of the journals under overwritable statuses stored in the cache memory, and another input of another threshold value for the empty storage capacity of the second storage device, which are employed in the judgment by the journal lasting judging unit; and
the journal setting unit sets the threshold value for the amount of the journals under overwritable statuses stored on the cache memory, and the threshold value for the empty storage capacity of the second storage device.

7. The storage system according to claim 5, wherein the check point managing unit notifies whether or not predetermined identification information included in the received predetermined instruction and the received predetermined instruction are valid.

8. The storage system according to claim 5, wherein:
the control unit further comprises a journal setting unit for setting a function of the storage system;
the journal setting unit provides an interface which is inputted to set a function of the journal lasting judging unit and a function of the check point managing unit to be one of valid and invalid; and
the journal setting unit sets the function of the journal lasting unit and the function of the check point managing unit to be one of valid and invalid.

9. A data reconstruction method for use in a storage system which is coupled to a computer, the storage system comprising:
a first storage device; a second storage device for storing thereinto a journal corresponding to an update history of data stored in the first storage device; and a cache memory for temporarily storing thereinto one of data and the journal which are transmitted and received between the computer and the storage system, and the computer having a database management system that includes a managing unit for recording a log in a log file stored in the storage system in correspondence with identification information of a generated check point when a check point is generated, for recording the identification information of the generated check point, and for notifying that the check point has been generated to the storage system in combination with the identification information of the check point; a log analyzing unit for, when the log analyzing unit receives a recovery instruction including a reconstruction time instant, retrieving a log corresponding to the reconstruction time instant included in the recovery instruction from the log file to acquire a log which has been recorded before a time instant when the retrieved log corresponding to the reconstruction time instant was recorded and includes identification information of a latest check point, and transmitting the identification information of the check point included in the acquired log to the storage system in combination with the restore instruction; and a log applying unit for applying the log corresponding to the identification information of the check point restored by the storage system up to the log corresponding to the reconstruction time instant with respect to the database file restored by the storage system, the data reconstruction method comprising the steps of:
newly generating the journal as a journal under overwritable status in case of which an update instruction with respect to the data stored in the first storage device is received;
overwriting, in case of which an update instruction with respect to the data stored in the first storage device is received and in case of which a journal corresponding to the same address generated by updating data at the same address as the address where the data to be updated is stored has already been stored in the cache memory and is under overwritable status, the newly generated journal on a journal corresponding to the same address;

storing, in case of which the journal corresponding to the same address is not stored in the cache memory or in case of which the journal corresponding to the same address is under not-overwritable status, the newly generated journal in a new storage area of the cache memory;

changing, in case of which a predetermined instruction is received from the computer, which includes predetermined identification information for specifying a reconstruction time instant of the data stored in the first storage device, the journal under overwritable status stored in the cache memory into a journal under not-overwritable status to generate a journal under not-overwritable status in correspondence with the predetermined identification information included in the predetermined instruction, and storing the generated journal in the cache memory;

writing at predetermined timing in order to reflect the data stored in the cache memory to one of the first storage device and the second storage device; and reconstructing, in case of which a restore instruction including the predetermined identification information is received from the computer, the data stored in the first storage device by employing the journal recorded in the second storage device before the journal corresponding to the predetermined identification information included in the received restore instruction.

10. A computer system, comprising:

a computer for executing a database management system; and a storage system coupled to the computer, wherein:

the storage system comprises: a control unit for processing an access request transmitted from the computer, a first storage device, a second storage device, and a third storage device;

the first storage device stores thereinto a database file which stores thereinto data accessed by the database management system, and a control file which includes control information of the database management system;

the second storage device stores thereinto a journal corresponding to an update history of the data stored in the first storage device;

the third storage device stores thereinto a log file which is generated by the database management system and records a log corresponding to the update history of the database file;

the control unit comprises:

a cache memory for temporarily storing thereinto data and the journal which are transferred between the storage system and the computer;

a journal control unit operated for, in case of which an update instruction with respect to the data stored in the first storage device is received, setting the journal as a journal under overwrite status to newly generate a journal;

a journal overwrite judging unit for, in case of which an update instruction with respect to the data stored in the first storage device is received, judging whether or not the journal corresponding to the same address generated by updating data at an address identical to the address where the data to be updated is stored has already been stored in the cache memory and is under overwritable status; and a journal lasting unit for, in case of which a notification that a check point which constitutes a base point of a reconstruction of the database file has been generated is received from the computer in combination with the identification information of the check point, changing the journal under overwritable status stored in the cache memory into a journal under not-overwritable status;

the control unit writes the data stored in the cache memory in order to reflect the data in one of the first storage device, the second storage device, and the third storage device at predetermined timing;

in case of which the journal control unit receives an update instruction with respect to the data stored in the first storage device, in case of which the journal corresponding to the same address has already been stored in the cache memory and is under overwritable status, the journal control unit overwrites the newly generated journal on the journal corresponding to the same address, and in case of which the journal corresponding to the same address is not stored in the cache memory or in case of which the journal corresponding to the same address is under not-overwritable status, the journal control unit stores the newly generated journal into a new storage area of the cache memory;

in case of which the journal control unit receives a notification that the check point has been generated from the computer, the journal control unit generates a journal under not-overwritable status in correspondence with the identification information of the generated check point and stores the generated journal into the cache memory after the process operation executed by the journal lasting unit;

in case of which the journal control unit receives a restore instruction including the identification information of the check point from the computer, the journal control unit restores the data including the database file and the control file stored in the first storage device by employing a journal recorded in the second storage device before the journal corresponding to the identification information of the check point included in the received restore instruction; and the database management system comprises:

a managing unit for recording a log in the log file in correspondence with the identification information of the generated check point in case of which the check point is generated, for recording the identification information of the generated check point in the control file, and for notifying such a fact that the check point has been generated to the storage system in combination with the identification information of the check point;

a log analyzing unit for, in case of which the log analyzing unit receives a recovery instruction including a reconstruction time instant, retrieving a log corresponding to the reconstruction time instant included in the recovery instruction from the log file to acquire a log which has been recorded before a time instant when the retrieved log corresponding to the reconstruction time instant was recorded and includes identification information of the latest check point, and transmitting the identification information of the check point included in the acquired log to the storage system in combination with the restore instruction; and a log applying unit for applying the log corresponding to the identification information of the check point recorded in the control file restored by the storage system up to the log corresponding to the reconstruction time instant with respect to the database file restored by the storage system.

11. Then computer system according to claim 10, wherein:

the control unit further comprises:

a journal lasting judging unit for judging whether or not an amount of the journals under overwritable statuses stored in the cache memory is larger than a predetermined threshold value and an empty storage capacity of the second storage device is larger then a predetermined threshold value in case of which a notification that the check point has been generated is issued from the computer; and a check point managing unit for setting the notification of generating of the check point to be one of valid and invalid based upon the judgment result made by the journal lasting judging unit;

the journal lasting unit changes the journal under overwritable status stored in the cache memory into a journal under not-overwritable status based upon the judgment result made by the journal lasting judging unit;

in case of which the journal control unit receives the restore instruction from the computer, the journal control unit judges whether or not a notification of generating of a check point, which is specified by identification information of the check point included in the received restore instruction, is valid;

in case of which the specified notification of generating of the check point is valid, the journal control unit reconstructs the data stored in the first storage device by a journal recorded in the second storage device before the journal corresponding to the identification information of the check point included in the received restore instruction; and in case of which the specified notification of generating of the check point is invalid, the journal control unit acquires identification information of a check point which is received before the specified notification of generating of the check point and corresponds to a notification of generating of the latest effective check point, and the journal control unit restores the data stored in the first storage device by employing the journal recorded in the second storage device before the journal corresponding to the acquired identification information of the check point.

* * * * *